US011012766B2

(12) United States Patent
Cho et al.

(10) Patent No.: US 11,012,766 B2
(45) Date of Patent: May 18, 2021

(54) ELECTRONIC DEVICE INCLUDING SPEAKER MODULE

(71) Applicant: Samsung Electronics Co., Ltd., Gyeonggi-do (KR)

(72) Inventors: Joonrae Cho, Gyeonggi-do (KR); Sunyoung Lee, Gyeonggi-do (KR); Kiwon Kim, Gyeonggi-do (KR); Myoungsung Sim, Gyeonggi-do (KR); Junghyeon Kim, Gyeonggi-do (KR); Hakhoon Song, Gyeonggi-do (KR); Feygenson Oleg, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/665,467

(22) Filed: Oct. 28, 2019

(65) Prior Publication Data
US 2020/0177979 A1 Jun. 4, 2020

(30) Foreign Application Priority Data
Dec. 4, 2018 (KR) .................. 10-2018-0154376

(51) Int. Cl.
*H04R 1/02* (2006.01)
*H04M 1/02* (2006.01)

(52) U.S. Cl.
CPC .......... *H04R 1/026* (2013.01); *H04M 1/0266* (2013.01); *H04M 1/0274* (2013.01); *H04R 2201/029* (2013.01); *H04R 2499/11* (2013.01)

(58) Field of Classification Search
USPC .................................................... 361/679.02
See application file for complete search history.

(56) References Cited

U.S. PATENT DOCUMENTS

| 8,537,543 B2 * | 9/2013 | Wang | H05K 5/061 361/679.56 |
| 8,654,517 B2 * | 2/2014 | Aumiller | G06F 1/1637 361/679.02 |
| 8,934,226 B2 * | 1/2015 | Smith | G06F 1/1637 361/679.2 |

(Continued)

FOREIGN PATENT DOCUMENTS

| JP | 2010-283451 A | 12/2010 |
| KR | 10-1983-0001775 A | 5/1983 |

(Continued)

OTHER PUBLICATIONS

International Search Report dated Jan. 29, 2020.

*Primary Examiner* — Lisa Lea-Edmonds
(74) *Attorney, Agent, or Firm* — Cha & Reiter, LLC

(57) ABSTRACT

An electronic device is disclosed. The electronic device includes a side bezel structure at least partially circumferentially surrounding a space defined between a front surface and a rear surface of the electronic device, a first supporting member disposed in the space, a display disposed on one surface of the first supporting member as to output a screen towards a frontal direction of the electronic device, and a speaker module, wherein at least a portion of the speaker module is disposed between the first supporting member and the display or between the side bezel structure and the display.

16 Claims, 18 Drawing Sheets

(56) References Cited

U.S. PATENT DOCUMENTS

| | | | | |
|---|---|---|---|---|
| 9,007,758 | B2* | 4/2015 | Wilson | H04B 1/3888 |
| | | | | 361/679.26 |
| 9,160,961 | B2* | 10/2015 | Kawasaki | H05K 5/03 |
| 9,256,258 | B2* | 2/2016 | Burch | G06F 1/1628 |
| 9,479,850 | B2* | 10/2016 | Lee | H04M 1/035 |
| 9,516,455 | B2* | 12/2016 | Wilson | H04M 1/72575 |
| 10,015,574 | B1* | 7/2018 | Luce | H04R 1/025 |
| 10,154,327 | B2* | 12/2018 | Auclair | G10K 11/18 |
| 10,165,378 | B2* | 12/2018 | Liang | H04R 27/00 |
| 10,180,702 | B2* | 1/2019 | Dabov | H04M 1/026 |
| 10,181,314 | B2* | 1/2019 | Baym | G10K 11/178 |
| 10,250,729 | B1* | 4/2019 | Jeon | H04R 1/2811 |
| 10,291,983 | B2* | 5/2019 | Baym | H04R 1/403 |
| 10,356,500 | B2* | 7/2019 | Kim | H04M 1/035 |
| 10,433,050 | B2* | 10/2019 | Lee | H04R 1/086 |
| 10,499,142 | B1* | 12/2019 | McClary | H04R 1/023 |
| 10,524,033 | B2* | 12/2019 | Vaturi | G06F 1/1616 |
| 10,594,845 | B2* | 3/2020 | Hebert | H04M 1/0262 |
| 10,595,107 | B2* | 3/2020 | Vitt | H04R 1/023 |
| 10,602,249 | B2* | 3/2020 | Jung | H04M 1/18 |
| 2002/0160683 | A1 | 10/2002 | Dannhauser et al. | |
| 2014/0050348 | A1 | 2/2014 | Hawker et al. | |
| 2015/0261033 | A1 | 9/2015 | Shin et al. | |
| 2017/0041693 | A1 | 2/2017 | Jia et al. | |
| 2017/0134545 | A1 | 5/2017 | Lee et al. | |
| 2017/0245032 | A1* | 8/2017 | Yoon | H04R 1/086 |
| 2020/0037069 | A1* | 1/2020 | Park | H04R 3/08 |
| 2020/0059544 | A1* | 2/2020 | Hwang | H04R 17/00 |

FOREIGN PATENT DOCUMENTS

| | | |
|---|---|---|
| KR | 10-2002-0046997 A | 6/2002 |
| KR | 10-2011-0051277 A | 5/2011 |
| KR | 10-2015-0082043 A | 7/2015 |
| KR | 10-2016-0117563 A | 10/2016 |
| KR | 10-2018-0071115 A | 6/2018 |

\* cited by examiner

ELECTRONIC DEVICE INCLUDING SPEAKER MODULE

CROSS-REFERENCE TO RELATED APPLICATION(S)

This application is based on and claims priority under 35 U.S.C. 119 to Korean Patent Application No. 10-2018-0154376, filed on Dec. 4, 2018, in the Korean Intellectual Property Office, the disclosure of which is herein incorporated by reference in its entirety.

BACKGROUND

Technical Field

Certain embodiments of the disclosure relate to electronic devices, and more particularly, to electronic devices equipped with a speaker module.

Description of Related Art

Developing electronic information communication technology integrates various functionalities into a single electronic device. For example, smartphones include the functionalities of a sound player, imaging device, and scheduler, as well as communication functionality and, on top of that, may implement more various functions by having additional applications installed thereon. An electronic device may not only have equipped applications or stored files available for access, wiredly or wirelessly, a server or another electronic device to receive, in real-time, various pieces of information.

As these devices are more commonly in daily carrying and general use, demand has grown for more compactness, communication performance, data processing rate, and multimedia quality. For example, an electronic device are continually improving in terms faster communication and processing speeds, a more compact designs, and better stability in transmission/reception efficiency, better sound reception and reproduction (e.g., a microphone or speaker module), and high fidelity displays and speakers which may produce high quality multimedia playback, and ever improving optical module (e.g., a camera) for capturing images.

As the sound module, e.g., a microphone or speaker module, is mounted closer to the egress holes through which sound is actually input/output, or, as the ducting through which the sound travels becomes simpler, higher-quality sound may be both input and output. In contrast, a prolonged or complicated sound travel path is more likely to attenuate sound pressure. A high-range sound which is more straightforward than sounds of other ranges may experience more attenuation as the distance between the sound module and the sound input/output hole increases or the sound travel path is complicated. For example, a high-range sound may be delivered in better quality to the user as the distance to the speaker hole, which is exposed to the outside of the electronic device, reduces and the surface (e.g., a diaphragm) of the sound module, where sounds are input/output, is aligned with the position where it faces the sound input/output holes.

The above information is presented as background information only to assist with an understanding of the disclosure. No determination has been made, and no assertion is made, as to whether any of the above might be applicable as prior art with regard to the disclosure.

SUMMARY

According to certain embodiments, there may be provided an electronic device with enhanced sound quality in a structure for mounting a sound module, e.g., a speaker module.

According to certain embodiments, there may be provided an electronic device with a stable coupling structure between other components (e.g., a side bezel structure and a rear plate) while facilitating assembly of a sound module.

According to certain embodiments, there may be provided an electronic device with enhanced waterproof and dust-proof capability by a stable coupling structure between other components (e.g., a side bezel structure and a rear plate).

In accordance with certain embodiments, an electronic device includes a side bezel structure at least partially circumferentially surrounding a space defined between a front surface and a rear surface of the electronic device, a first supporting member disposed in the space, a display disposed on one surface of the first supporting member as to output a screen towards a frontal direction of the electronic device; and a speaker module, wherein at least a portion of the speaker module is disposed between the first supporting member and the display or between the side bezel structure and the display.

In accordance with certain embodiments, an electronic device includes a side bezel structure at least partially circumferentially surrounding a space defined between a front surface and a rear surface of the electronic device, a first supporting member disposed in the space, a display disposed on one surface of the first supporting member to output a screen towards a frontal direction of the electronic device, a rear plate coupled with the side bezel structure and facing an opposite surface of the first supporting member, a waterproofing member coupling the rear plate to the side bezel structure, and a speaker module including a flange disposed between the first supporting member and the display, wherein the flange is attached to the first supporting member, forming a waterproof structure between the flange and the first supporting member.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, in which.

DETAILED DESCRIPTION

Figure 1:
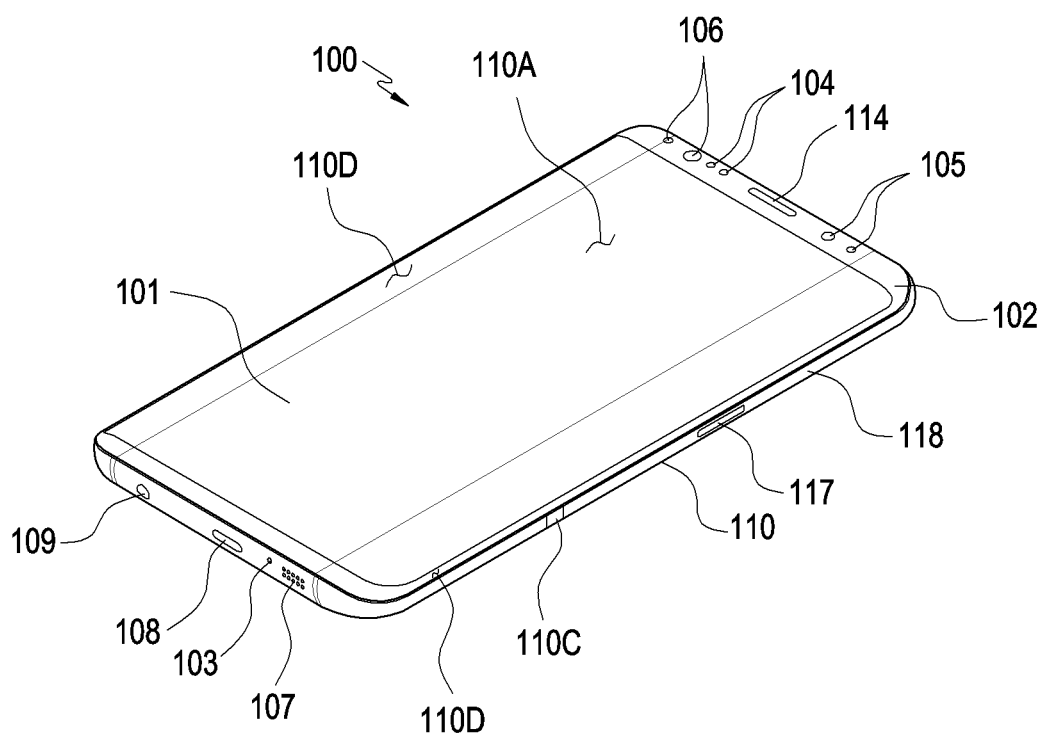
FIG. 1 is a perspective view illustrating a front surface of an electronic device according to certain embodiments.

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms coming with ordinal numbers such as 'first' and 'second' may be used to denote various components, but the components are not limited by the terms. The terms are used only to distinguish one component from another. For example, a first component may be denoted a second component, and vice versa without departing from the disclosure. The term "and/or" may denote a combination(s) of a plurality of related items as listed or any of the items. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as desired.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

Figure 2:
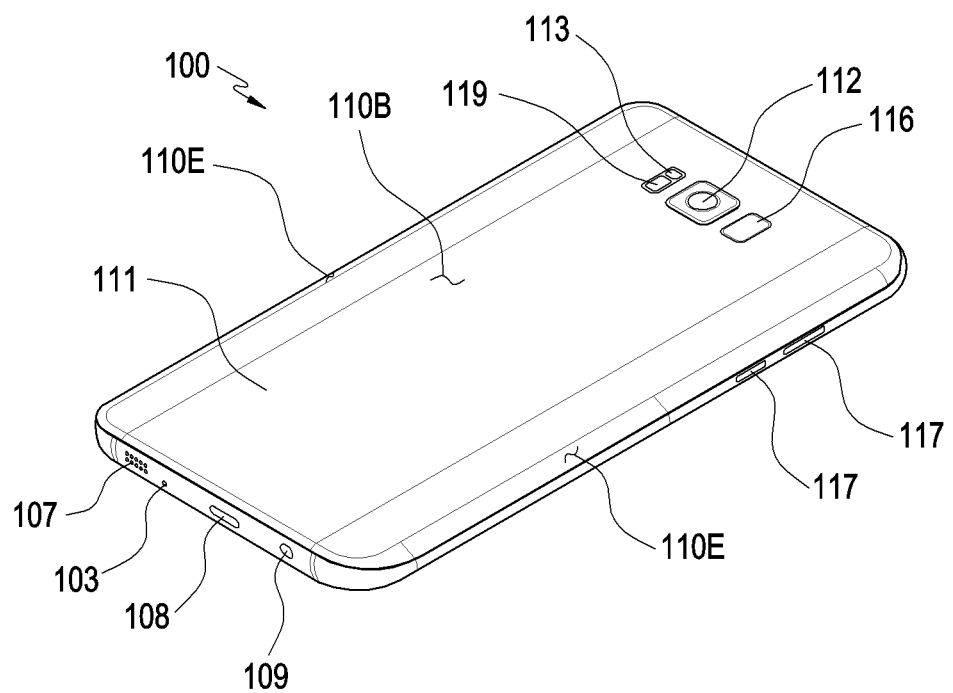
FIG. 2 is a rear, perspective view illustrating an electronic device as illustrated in FIG. 1.

FIG. 1 is a front perspective view illustrating an electronic device 100 according to an embodiment. FIG. 2 is a rear, perspective view illustrating an electronic device 100 as illustrated in FIG. 1.

Referring to FIG. 1 and FIG. 2, according to an embodiment, an electronic device 100 may include a housing 110 with a first (or front) surface 110A, a second (or rear) surface 110B, and a side surface 110C surrounding a space between the first surface 110A and the second surface 110B. According to another embodiment (not shown), the housing may denote a structure forming part of the first surface 110A, the second surface 110B, and the side surface 110C of FIG. 1. According to an embodiment, at least part of the first surface 110A may have a substantially transparent front plate 102 (e.g., a glass plate or polymer plate including various coat layers). The second surface 110B may be formed of a substantially opaque rear plate 111. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 118 that couples to the front plate 102 and the rear plate 111 and includes a metal and/or polymer. According to an embodiment, the rear plate 111 and the side bezel plate 118 may be integrally formed together and include the same material (e.g., a metal, such as aluminum).

In the embodiment illustrated, the front plate 102 may include two first regions 110D, which seamlessly and bendingly extend from the first surface 110A to the rear plate 111, on both the long edges of the front plate 102. In the embodiment (refer to FIG. 2) illustrated, the rear plate 111 may include second regions 110E, which seamlessly and bendingly extend from the second surface 110B to the front plate 102, on both the long edges. According to an embodiment, the front plate 102 (or the rear plate 111) may include one of the first regions 110D (or the second regions 110E). Alternatively, the first regions 110D or the second regions 110E may partially be excluded. According to an embodiment, at a side view of the electronic device 100, the side bezel structure 118 may have a first thickness (or width) for sides that do not have the first regions 110D or the second regions 110E and a second thickness, which is smaller than the first thickness, for sides that have the first regions 110D or the second regions 110E.

According to an embodiment, the electronic device 100 may include at least one or more of a display 101, audio modules as disposed in holes 103, 107, and 114, sensor modules 104, 116, and 119, camera modules 105, 112, and 113, key input devices 117, a light emitting device 106, and connector holes 108 and 109. According to an embodiment, the electronic device 100 may exclude at least one (e.g., a key input device 117 or the light emitting device 106) of the components or may add other components.

The display 101 may be exposed through the top of, e.g., the front plate 102. According to an embodiment, at least a portion of the display 101 may be exposed through the front plate 102 forming the first surface 110A and the first regions 110D of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101.

According to an embodiment (not shown), the screen display region of the display 101 may have a recess or opening in a portion thereof, and at least one or more of the audio module as disposed in speaker hole 114, sensor module 104, camera module 105, and light emitting device 106 may be aligned with the recess or opening. According to an embodiment (not shown), at least one or more of the audio module as disposed in a speaker hole 114, sensor module 104, camera module 105, fingerprint sensor 116, and light emitting device 106 may be included on the rear surface of the screen display region of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 104 and 119 and/or at least part of the key input device 117 may be disposed in the first regions 110D and/or the second regions 110E.

The audio modules may be disposed as to utilize a microphone hole 103 and speaker holes 107 and 114. The microphone hole 103 may have a microphone inside to obtain external sounds. According to an embodiment, there may be a plurality of microphones to be able to detect the direction of a sound. The speaker holes 107 and 114 may include an external speaker hole 107 and a phone speaker hole 114. According to an embodiment, the speaker holes 107 and 114 and the microphone hole 103 may be implemented as a single hole, or speakers may be rested without the speaker holes 107 and 114 (e.g., piezo speakers).

The sensor modules 104, 116, and 119 may generate an electrical signal or data value corresponding to an internal operating state or external environmental state of the electronic device 100. The sensor modules 104, 116, and 119 may include a first sensor module 104 (e.g., a proximity sensor) and/or a second sensor module (not shown) (e.g., a fingerprint sensor) disposed on the first surface 110A of the housing 110 and/or a third sensor module 119 (e.g., a heart-rate monitor (HRM) sensor) and/or a fourth sensor module 116 (e.g., a fingerprint sensor) disposed on the second surface 110B of the housing 110. The fingerprint sensor may be disposed on the second surface 110A as well as on the first surface 110B (e.g., the display 101) of the housing 110. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B. The camera modules 105 and 112 may include one or more lenses, an image sensor, and/or an image signal processor. The flash 113 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include the sensor module 116 disposed on the second surface 110B of the housing 110.

The light emitting device 106 may be disposed on, e.g., the first surface 110A of the housing 110. The light emitting device 106 may provide, e.g., information about the state of the electronic device 100 in the form of light. According to an embodiment, the light emitting device 106 may provide a light source that interacts with, e.g., the camera module 105. The light emitting device 106 may include, e.g., a light emitting device (LED), an infrared (IR) LED, or a xenon lamp.

The connector holes 108 and 109 may include a first connector hole 108 for receiving a connector (e.g., a universal serial bus (USB) connector) for transmitting or receiving power and/or data to/from an external electronic device and/or a second connector hole 109 (e.g., an earphone jack) for receiving a connector for transmitting or receiving audio signals to/from the external electronic device.

Figure 3:
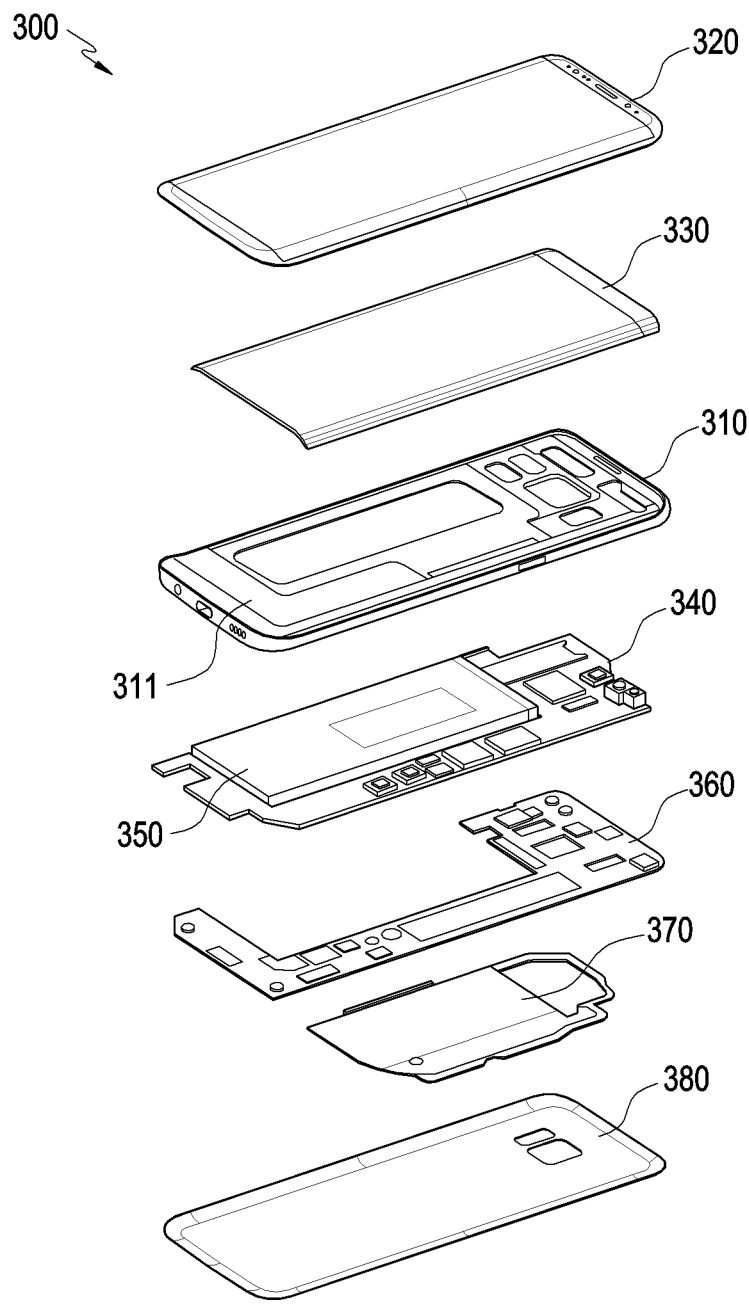
FIG. 3 is an exploded perspective view illustrating an electronic device as illustrated in FIG. 1.

FIG. 3 is an exploded perspective view illustrating an electronic device 300 as illustrated in FIG. 1.

Referring to FIG. 3, an electronic device 300 may include a side bezel structure 310, a first supporting member 311 (e.g., a bracket), a front plate 320, a display 330, a printed circuit board (PCB) 340, a battery 350, a second supporting member 360 (e.g., a rear case), an antenna 370, and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 100 of FIG. 2 and no duplicate description is made below.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processor, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 350 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrated or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power utilized for charging. According to an embodiment, an antenna structure may be formed by a portion or combination of the side bezel structure 310 and/or the first supporting member 311.

Figure 4:
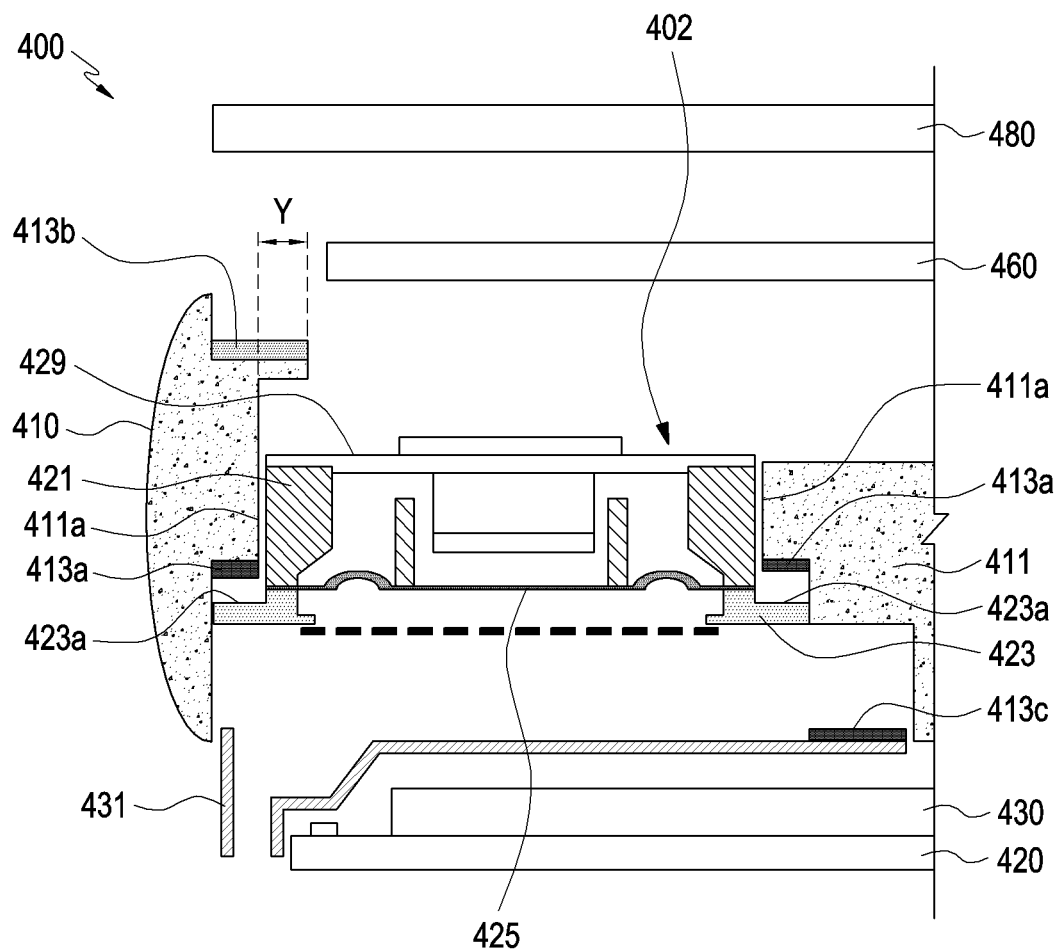
FIG. 4 is an exploded cross-sectional view illustrating an electronic device according to an embodiment.
Figure 5:
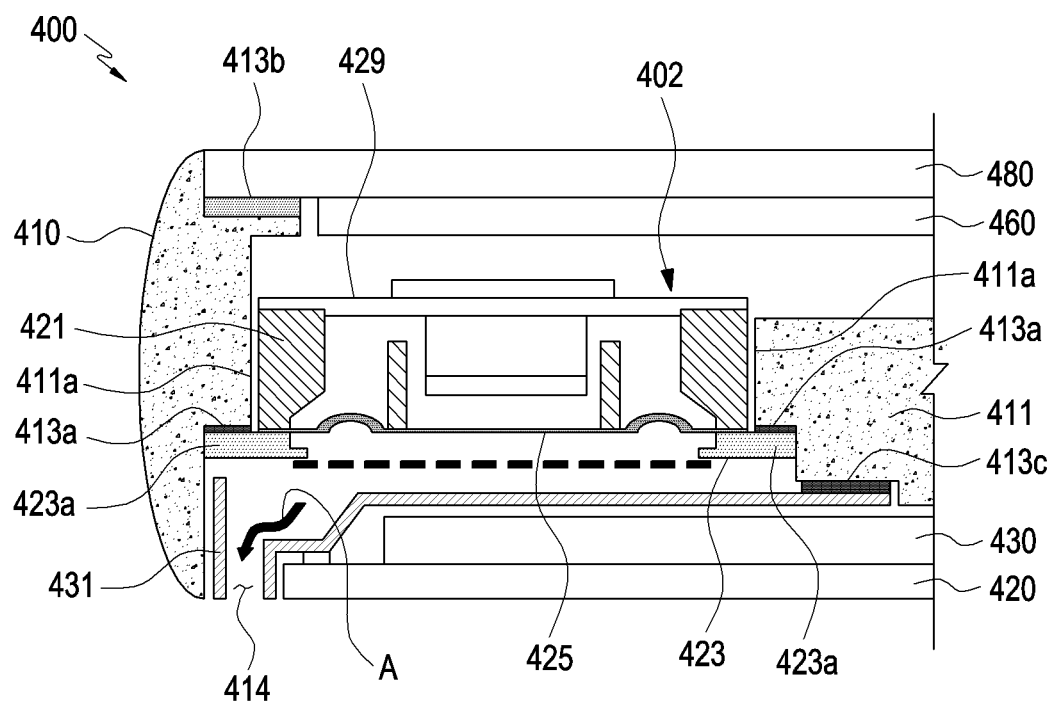
FIG. 5 is a cross-sectional view illustrating an electronic device according to an embodiment.

FIG. 4 is an exploded cross-sectional view illustrating an electronic device 400 according to an embodiment. FIG. 5 is a cross-sectional view illustrating an electronic device 400 according to an embodiment.

Referring to FIG. 4 and FIG. 5, according to an embodiment, an electronic device 400 may include a side bezel structure 410, a first supporting member 411, a display 430, or a speaker module 402. At least a portion of the speaker module 402 may be disposed between the first supporting member 411 and the display 430 or between the side bezel structure 410 and the display 430.

According to certain embodiments, the side bezel structure 410 may be formed to at least partially surround a space between a front surface (e.g., the first surface 110A of FIG. 1) and rear surface (e.g., the second surface 110B of FIG. 2) of the electronic device 400. According to an embodiment, the side bezel structure 410 may form at least a portion of a side surface (e.g., the side surface 110C of FIG. 1) of the electronic device 400. Alternatively, the side bezel structure 410 may include a metal and/or polymer and may be shaped substantially as a frame forming the side surface of the electronic device 400. According to an embodiment, when the side bezel structure 410 includes a metallic material, and the metallic portion may be insulated from the rest of the other portions, and be utilized as an antenna for transmitting or receiving radio signals.

According to an embodiment, the first supporting member 411 may be disposed in the electronic device 400, e.g., in an area or space surrounded by the side bezel structure 410. According to an embodiment, the first supporting member 411 may be shaped as a flat plate one surface of which is disposed to substantially face the inner side surface of the display 430. Here, it is noted that when 'A and B are disposed to face each other,' A and B may directly face each other and, without limitations, another component may be disposed between A and B. For example, although 'one surface of the first supporting member faces the inner side surface of the display' as described herein, various electrical wires, thermal insulating structures, or shock-absorbing structures may be disposed between the first supporting member 411 and the inner side surface of the display 430.

According to an embodiment, although the side bezel structure 410 and the first supporting member 411 are described herein as distinct from each other, the first supporting member 411 may be integrally formed with the side bezel structure 410. For example, a plurality of metallic portions and synthetic resin portions may be combined together by, e.g., die casting, insert molding, or lathing so that the side bezel structure 410 and the first supporting member 411 may be integrally formed with each other. Part of the metallic portions of the side bezel structure 410 or the first supporting member 411 may function as an antenna. Alternatively, the first supporting member 411 may be manufactured separately from the side bezel structure 410 and be assembled and mounted on the inner side surface of the side bezel structure 410.

According to an embodiment, the first supporting member 411 may include a receiving hole 411a. The receiving hole 411a may be formed through the first supporting member 411 from a first surface (e.g., the surface facing the inner side surface of the display 430) to the opposite surface of the first supporting member 411 (e.g., the surface facing away from the first surface of the first supporting member 411). According to an embodiment, when the first supporting member 411 is integrally formed with the side bezel structure 410, a portion of the inner wall of the receiving hole 411a may include a portion of the inner side surface of the side bezel structure 410.

According to an embodiment, the display 430 (e.g., the display 330 of FIG. 3) may be disposed on one surface of the first supporting member 411 to output a screen towards a frontal direction of the electronic device 400. The electronic device 400 may include a window member 420 (e.g., the front plate 320 of FIG. 3) coupled to the outer side surface of the display 430, and the window member 420 may permit visibility of the screen output from the display 430 while protecting the display 430 from the external environment.

According to an embodiment, the speaker module 402 may include a casing 421 receiving an electrical device, e.g., a voice coil or magnet, and a first cover member 423 coupled to one surface of the casing 421. According to an embodiment, a second cover member 429 may be coupled to another surface of the casing 421. A diaphragm 425 may be disposed in an inner space of the first cover member 423 or the casing 421, e.g., between the casing 421 and the first cover member 423 and may be vibrated by a signal applied to an electric device, e.g., a voice coil, in order to produce a sound. According to an embodiment, the first cover member 423 may emit the sound produced by the diaphragm 425 while protecting the diaphragm 425 from the external environment. According to an embodiment, when the speaker module 402 outputs another party's voice, the first cover member 423 may be disposed to face the front surface of the electronic device 400.

According to an embodiment, the speaker module 402 may include a flange 423a which extends from an outer side surface of the speaker module 402, e.g., an outer side surface of the casing 421 or an outer side surface of the first cover member 423. Here, that the 'flange extends from an outer side surface of the speaker module' may indicate a configuration in which the flange 423a is disposed to at least partially face the inner side surface of the display 430 or one surface of the first supporting member 411. As viewed from above the front surface of the electronic device 400, the flange 423a may be shaped as a closed loop surrounding the first cover member 423.

According to an embodiment, the electronic device 400 may further include a duct member 431. The duct member 431 may provide a travel path 'A' for a sound output by the speaker module 402 by connecting, e.g., a speaker hole 414 (e.g., the speaker hole 114 of FIG. 1) of the electronic device 400 with the speaker module 402. For example, the speaker module 402 may emit the sound to an exterior of the electronic device 400 substantially through the speaker hole 414.

According to an embodiment, the speaker hole 414 may be positioned at one side of the display 430. To provide a larger screen, the display 430 may be disposed to occupy a maximum permitted area of the front surface of the electronic device 400. For example, the speaker hole 414 may be disposed adjacent an edge (e.g., the top end) on the front surface of the electronic device 400 to avoid overlapping the display 430. According to an embodiment, aligning the speaker module 402 to directly face the speaker hole 414 may be limited, and the duct member 431 may be disposed to provide a sound travel path A between the speaker module 402 and the speaker hole 414.

According to an embodiment, the electronic device 400 may further include a second supporting member 460 or a rear plate 480 (e.g., the rear plate 380 or the second supporting member 360 of FIG. 3). The rear plate 480 may substantially form the rear surface (e.g., the second surface 110B of FIG. 2) of the electronic device 400 and be formed of glass to provide a more aesthetic appearance to the electronic device 400. According to an embodiment, the rear plate 480 may be coupled with the side bezel structure 410 while facing the opposite surface of the first supporting member 411. According to an embodiment, the electronic device 400 may include a waterproofing member 413b, e.g., a double-sided tape or adhesive, thereby attaching the edge of the rear plate 480 to the side bezel structure 410.

According to an embodiment, the second supporting member 460 may be disposed between the rear plate 480 and the first supporting member 411. According to an embodiment, the second supporting member 460 may reinforce the structural strength of the electronic device 400 and provide an electromagnetic shielding structure between electronic components (e.g., the circuit board 340 or antenna 370 of FIG. 3) inside the electronic device 400.

According to an embodiment, the display 430 may be mounted on the first supporting member 411, with the speaker module 402 assembled (e.g., coupled) with the first supporting member 411 and, after a circuit board (e.g., the circuit board 340 of FIG. 3) is disposed thereon, the second supporting member 460 or the rear plate 480 may be assembled (e.g., coupled) with the first supporting member 411 or the side bezel structure 410. According to an embodiment, the speaker module 402 may be assembled (e.g., inserted) into the receiving hole 411a in the direction from the front surface of the electronic device 400 to the rear surface of the electronic device 400. For example, at least a portion of the speaker module 402 may be received in the receiving hole 411a.

According to an embodiment, as the speaker module 402 is received in the receiving hole 411a, the flange 423a may be coupled to the first supporting member 411 around the receiving hole 411a. For example, the electronic device 400 may further include an adhesive member 413a (e.g., a waterproof tape) disposed around the receiving hole 411a, and the flange 423a may be attached to one surface of the first supporting member 411 by the adhesive member 413a. According to an embodiment, the adhesive member 413a may be shaped as a closed loop on one surface of the first supporting member 411 and may form a waterproof structure between the speaker module 402 (e.g., the flange 423a) and the first supporting member 411. For example, the adhesive member 413a may seal the receiving hole 411a along with the speaker module 402 between one surface of the first supporting member 411 and another.

According to an embodiment, with the speaker module 402 assembled, the duct member 431 may be mounted on the first supporting member 411. According to an embodiment, a portion of the duct member 431 may be brought in tight contact with the side bezel structure 410, and another portion thereof may be attached to the first supporting member 411 by, e.g., an adhesive or double-sided tape 413c. According to an embodiment, the adhesive or double-sided tape 413c may have a closed loop shape surrounding the area where the flange 423a is disposed on one surface of the first supporting member 411. For example, the sound travel path "A" formed by the duct member 431 may connect the speaker module 402 and the speaker hole 414, and isolate or seal off the other space in the electronic device 400.

According to an embodiment, the duct member 431 may be combined with the display 430 or window member 420 and, in the combined state, may be mounted, along with the display 430 or window member 420, on the first supporting member 411 (or the side bezel structure 410). Although not shown, the display 430 or the window member 420, as similarly to the rear plate 480, may be attached to the side bezel structure 410 or the first supporting member 411 by other waterproofing member(s).

According to an embodiment, the display 430 may be assembled on one surface of the first supporting member 411 and, after an electronic component (e.g., the circuit board 340 or battery 350 of FIG. 3) is assembled on another surface of the first supporting member 411, the second supporting member 460 and the rear plate 480 may subsequently be mounted on the other surface of the first supporting member 411. Before the second supporting member 460 and the rear plate 480 are mounted, the speaker module 402 or the display 430 may be electrically connected with other electronic component (e.g., the circuit board 340 or battery 350 of FIG. 3).

According to an embodiment, in a structure which sufficiently secures the area of attachment between the side bezel structure 410 and the rear plate 480, if the speaker module 402 is assembled with the first supporting member 411 in the rear direction of the electronic device 400, the distance between the speaker module 402 and the speaker hole 414 (e.g., the length of the sound travel path A) may increase, and the shape of the sound travel path A may be complicated. If the speaker module 402 may be assembled with the first supporting member 411 in the rear direction of the electronic device 400 while sufficiently securing, and getting around, the area of attachment between the side bezel structure 410 and the rear plate 480, the sound travel path A may be shortened. However, in a compact structure of the electronic device, it may be difficult to secure a space for assembling the speaker module 402 while getting around the area of attachment between the side bezel structure 410 and the rear plate 480. For example, it may be hard to secure a good sound quality of the electronic device while obtaining a sufficient area of attachment in the structure of assembling the speaker module 402 with the first supporting member 411 on the rear surface of the electronic device 400.

According to an embodiment, the structure of assembling the speaker module 402 with the first supporting member 411 on the front surface of the electronic device 400 may enhance sound quality while providing a stabilized assembly structure (e.g., a sufficient area of attachment between the side bezel structure 410 and the rear plate 480). For example, as the speaker module 402 is assembled with the first supporting member 411 (e.g., the receiving hole 411a) on the front surface of the electronic device 400, a sufficient area of attachment or coupling strength may be ensured between the side bezel structure 410 and the rear plate 480, and the waterproof/dustproof capability may be enhanced in proportion to the area of attachment. According to an embodiment, the speaker module 402 may be disposed closer to the edge of the electronic device 400 in a range permitted by the strength or thickness of the side bezel structure 410 regardless of the size of the area of attachment.

According to an embodiment, since the speaker module 402 may be disposed closer to the speaker hole 414, the sound travel path A may be shortened and be simplified in shape. For example, as the sound travel path A becomes shorter in length and simpler in shape, the quality of sounds the user hears in, at least, a high range may be enhanced. According to an embodiment, as viewed from above the front or rear surface of the electronic device 400, a portion of the speaker module 402 and the area of attachment between the side bezel structure 410 and the rear plate 480 may overlap each other in a width indicated with reference character 'Y.' For example, the speaker module 402 may partially be disposed between a portion of the side bezel structure 410 and the display 430. According to an embodiment, since the path of assembly of the speaker module 402 need not be considered, a sufficient area of attachment between the side bezel structure 410 and the rear plate 480 may be secured given the attaching strength or waterproof/dustproof capability.

Figure 6:
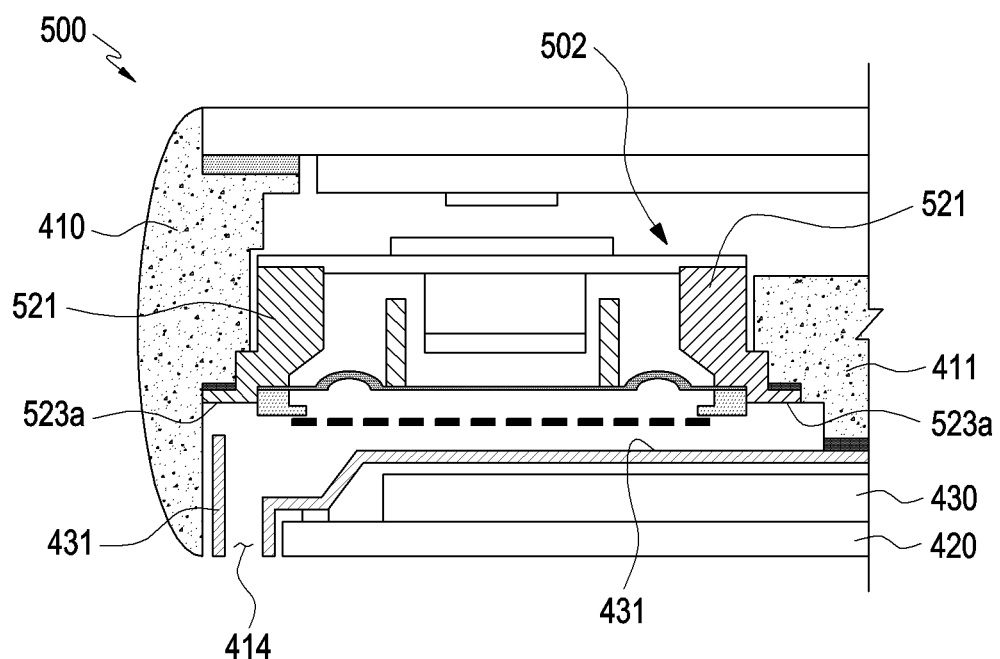
FIG. 6 is a cross-sectional view illustrating an electronic device as modified, according to an embodiment.

FIG. 6 is a cross-sectional view illustrating an electronic device 500 as modified, according to an embodiment.

In the following embodiments, the components similar to those in the above embodiments or easy to understand from the description of the above embodiments are denoted with or without the same reference numerals and their detailed description may be skipped.

Referring to FIG. 6, the electronic device 500, as modified, may differ from the electronic device, described above in connection with the prior embodiments, in light of the configuration of the flange 523a. For example, the flange 523a may extend from a casing 521 of a speaker module, which may differ in shape from the flange 423a of FIG. 4. A portion of the speaker module may be positioned between a portion (e.g., the area where the waterproofing member 413b is disposed) of the side bezel structure 410 and the display 430 (or the window member 420) or between the first supporting member 411 and the display 430.

Figure 7:
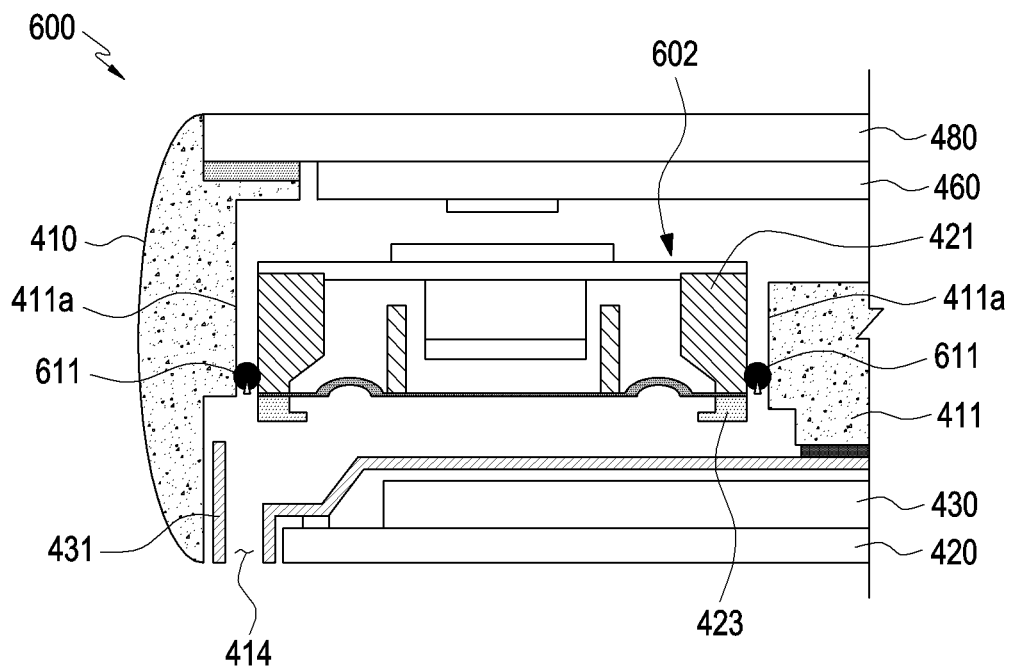
FIG. 7 is a cross-sectional view illustrating an electronic device according to an embodiment.

FIG. 7 is a cross-sectional view illustrating an electronic device 600 according to an embodiment.

Referring to FIG. 7, the embodiment differs from the prior embodiments, because the electronic device 600 lacks a flange (e.g., the flange 423a of FIG. 4 or the flange 523a of FIG. 6) and is fastened to the first supporting member 411 by a waterproof structure, e.g., an O-ring 611. For example, the O-ring 611 may be interposed between an inner wall of the receiving hole 411a and an outer side surface of the speaker module 402 (e.g., the casing 421). When the speaker module 602 is assembled in the receiving hole 411a, the O-ring 611 may come in tight contact with the inner wall of the receiving hole 411a and the outer side surface of the casing 421, thereby forming a waterproof structure between the speaker module 602 and the first supporting member 411.

Figures 8A, 8B, 8C:
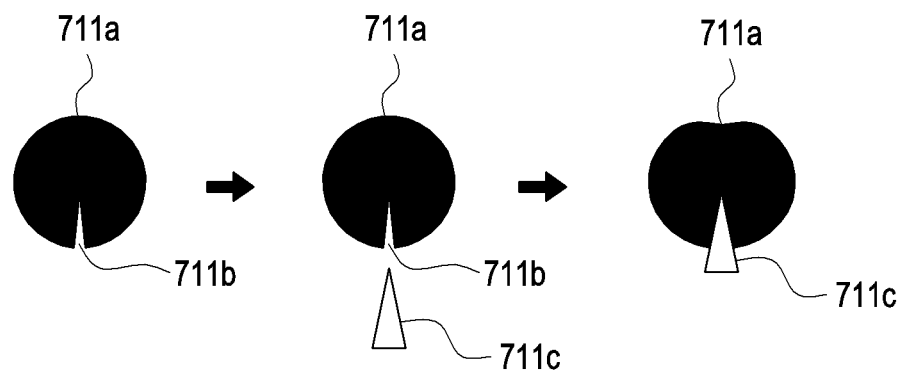
FIG. 8A, FIG. 8B, and FIG. 8C are a cross-sectional view illustrating an example waterproof structure of an electronic device according to an embodiment.

FIG. 8A, FIG. 8B, and FIG. 8C is a cross-sectional view illustrating an example waterproof structure of an electronic device according to an embodiment.

Referring to FIG. 8A, FIG. 8B, and FIG. 8C, an electronic device (e.g., the electronic device 600 of FIG. 7) may include a waterproof structure, e.g., an O-ring 711a and a reinforcing member 711c disposed between an inner wall of a receiving hole (e.g., the receiving hole 411a of FIG. 7) and an outer side surface of a speaker module (e.g., the speaker module 602 of FIG. 7). As shown in FIG. 8(a), the O-ring 711a may include a slit 711b, and the reinforcing member 711c may be inserted into the slit 711b. As the reinforcing member 711c is inserted, the waterproof structure, e.g., the O-ring 711a, may have an increased cross-sectional area, and the area where the inner wall of the receiving hole (e.g., the receiving hole 411a of FIG. 7) tightly contacts the outer side surface of the casing (e.g., the casing 421 of FIG. 7) may increase. For example, the waterproof structure including the reinforcing member 711c and the O-ring 711a of FIG. 8 may enhance waterproof capability while more securely fastening the speaker module 402 in the receiving hole 411a.

Figure 9:
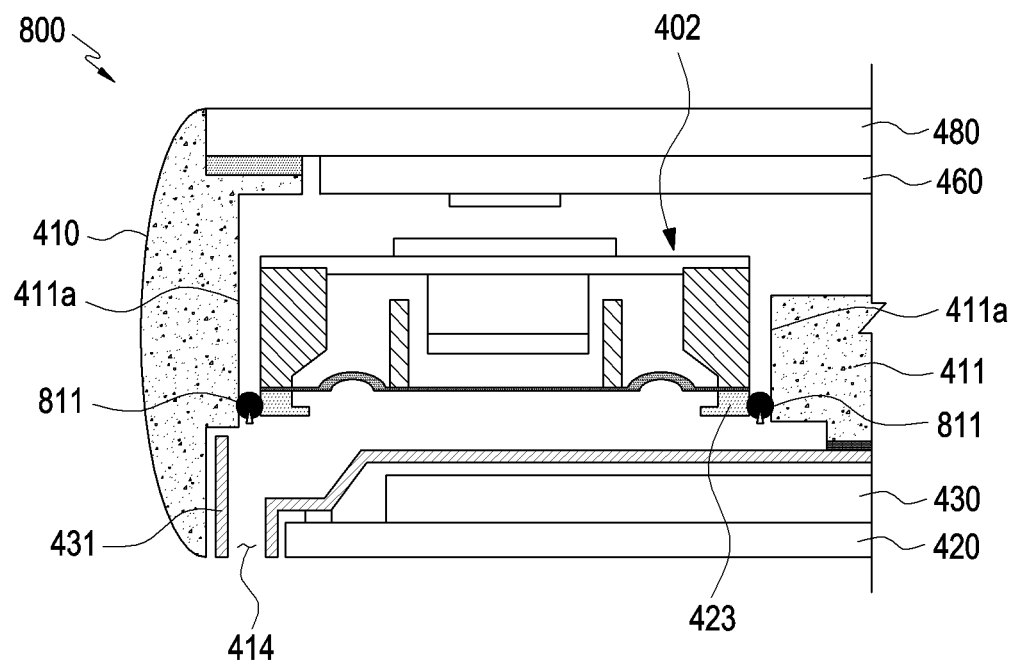
FIG. 9 is a cross-sectional view illustrating an electronic device as modified, according to an embodiment.

FIG. 9 is a cross-sectional view illustrating an electronic device 800 as modified, according to an embodiment.

Referring to FIG. 9, in the waterproof structure using an O-ring (e.g., the O-ring 611 or 711a of FIG. 7 or 8) or a reinforcing member (e.g., the reinforcing member 711c of FIG. 8), the O-ring 811 may be interposed between the inner wall of the receiving hole 411a and the outer side surface of the first cover member 423 of the speaker module 402. For example, if disposed between the outer side surface of the speaker module 402 and the inner wall of the receiving hole 411a, the O-ring 811 may be brought in contact with the outer side surface of the casing 421 as shown in FIG. 7 or the outer side surface of the first cover member 423 as shown in FIG. 9.

According to an embodiment, the speaker module 402, 502, or 602 described above in connection with FIGS. 4 to 9 may be electrically connected with a circuit board (e.g., the circuit board 340 of FIG. 4) of the electronic device via a wire, flexible printed circuit board, connector, or other electrical wirings. According to an embodiment, the speaker module 402, 502, or 602 may be electrically connected with the circuit board via a connecting member (e.g., a C-clip, pogo pin, or conductive tape) or conductive member, but not via a wire or flexible printed circuit board. A configuration in which the speaker module 402, 502, or 602 is connected with a circuit board via a connecting member or conductive member is described below, according to an embodiment.

Figure 10:
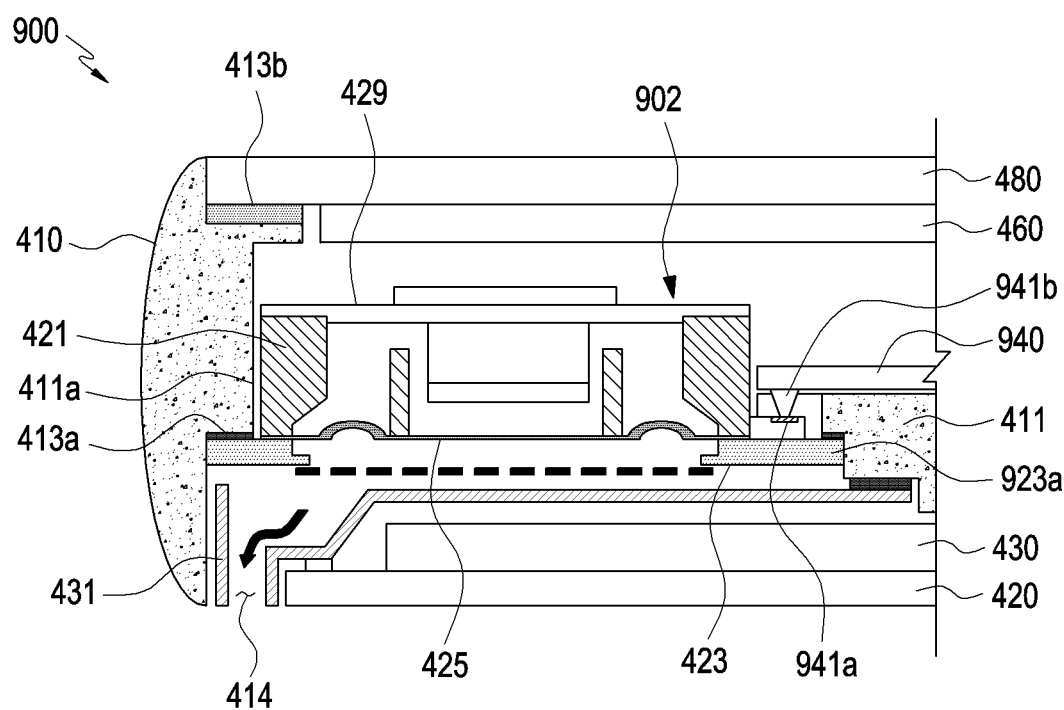
FIG. 10 is a cross-sectional view illustrating an electronic device according to an embodiment.
Figure 11:
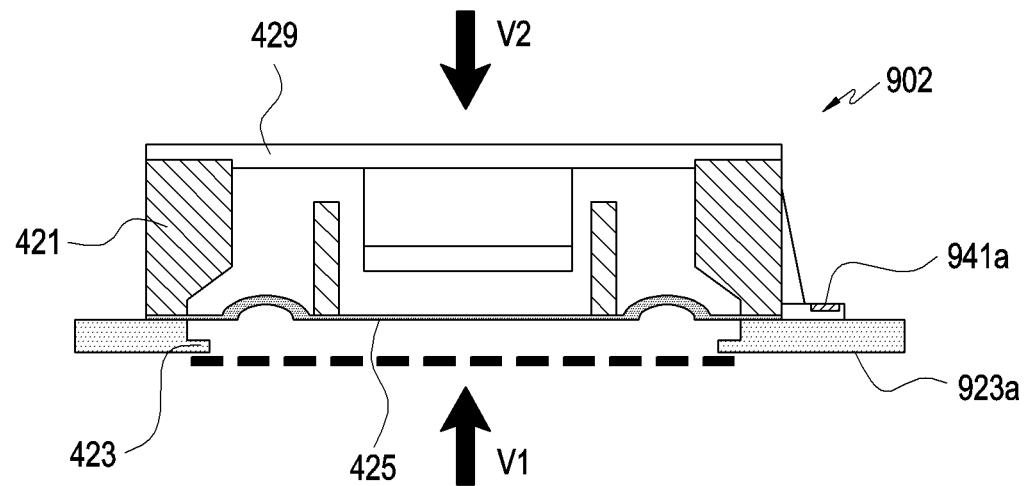
FIG. 11 is a cross-sectional view illustrating a speaker module in an electronic device according to an embodiment.
Figures 12, 13:
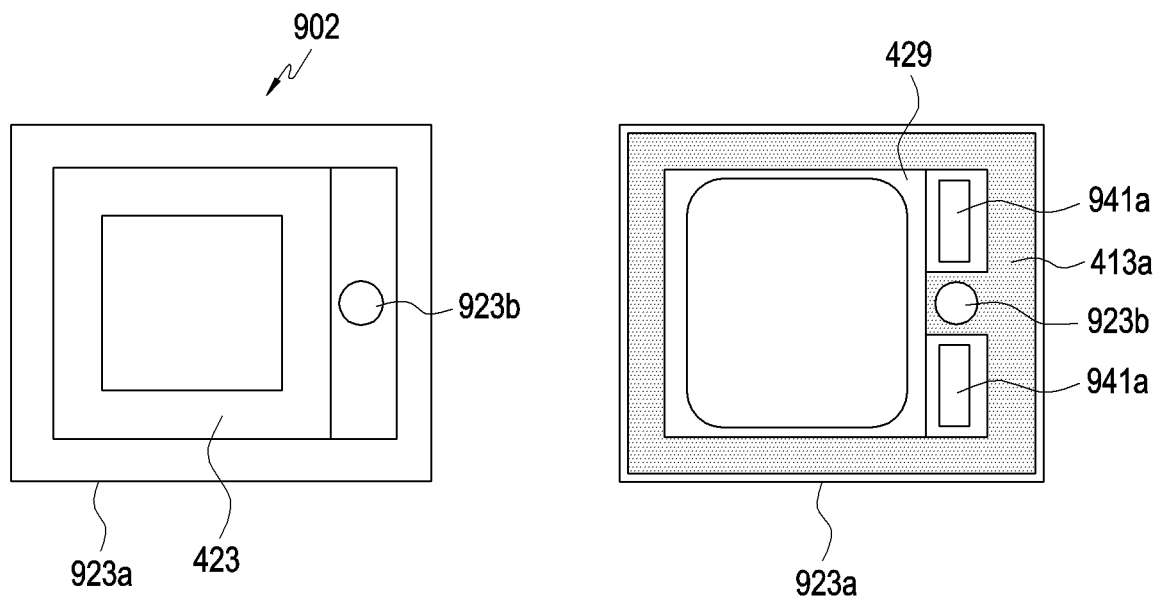
FIG. 12 is a view illustrating a speaker module as viewed in direction V1 of FIG. 11.
FIG. 13 is a view illustrating a speaker module as viewed in direction V2 of FIG. 11.

FIG. 10 is a cross-sectional view illustrating an electronic device 900 according to an embodiment. FIG. 11 is a cross-sectional view illustrating a speaker module 902 in an electronic device according to an embodiment. FIG. 12 is a view illustrating a speaker module 902 as viewed in direction V1 of FIG. 11. FIG. 13 is a view illustrating a speaker module 902 as viewed in direction V2 of FIG. 11.

Referring to FIG. 10, according to an embodiment, in an electronic device 900 (e.g., the electronic device 400 of FIG. 4), a speaker module 902 may be disposed to at least partially face a circuit board 940 (e.g., the circuit board 340 of FIG. 3) and be electrically connected with the circuit board 940 via a connecting member 941b, e.g., a C-clip, pogo pin, or conductive tape. Since the electronic device 900 of FIG. 10 is similar in configuration to the electronic device 400 of FIG. 4, no detailed description of the electronic device 900 is given for the sake of brevity and, in this embodiment, a configuration of the speaker module 902 or an electrical connection between the speaker module 902 and the circuit board 940 is described below in greater detail.

Referring to FIGS. 11 to 13, the speaker module 902 may be shaped so that a portion of the outer side surface thereof, e.g., an outer side surface of the casing 421, protrudes and may include at least one contact pad 941a disposed in the protruding portion of the casing 421. When the speaker module 902 is coupled with the first supporting member 411, the contact pad 941a may be disposed to face the rear surface (e.g., the second surface 110B of FIG. 2) of the electronic device 900. According to an embodiment, the protruding portion of the casing 421 may be a portion of a flange 923a (e.g., the flange 423a of FIG. 4) or be disposed as to correspond to a portion of the area where the flange 923a is formed. Alternatively, an adhesive member 413a (e.g., the adhesive member 413a of FIG. 4) may be attached onto the surface of the flange 923a which faces the rear surface of the electronic device 900.

According to an embodiment, the speaker module 902 may further include a screw hole 923b. The screw hole 923b may be formed through the flange 923a and be positioned on the first supporting member 411 around the receiving hole 411a. For example, the speaker module 902 may be mounted and fastened onto the first supporting member 411 by a coupling member (e.g., a screw) coupled through the screw hole 923b. According to an embodiment, when the speaker module 902 includes a pair of contact pads 941a, the screw hole 923b may be formed between the contact pads 941a. According to an embodiment, the speaker module 902 may include a plurality of screw holes spaced apart from each other at proper intervals.

According to an embodiment, with the speaker module 902 mounted on the first supporting member 411 by the adhesive member 413a or a screw (not shown), a portion of the speaker module 902, e.g., the contact pad 941a, may be disposed to face a portion of the circuit board 940. As mentioned above, the circuit board 940 may include a connecting member 941b, e.g., a C-clip, pogo pin or conductive tape. For example, as the connecting member 941b contacts the contact pad 941a, the speaker module 902 may be electrically connected with the circuit board 940. According to an embodiment, a connecting member (e.g., the connecting member 941b) may be provided to the speaker module 902, and a contact pad (e.g., the contact pad 941a) may be provided to the circuit board 940.

Figure 14:
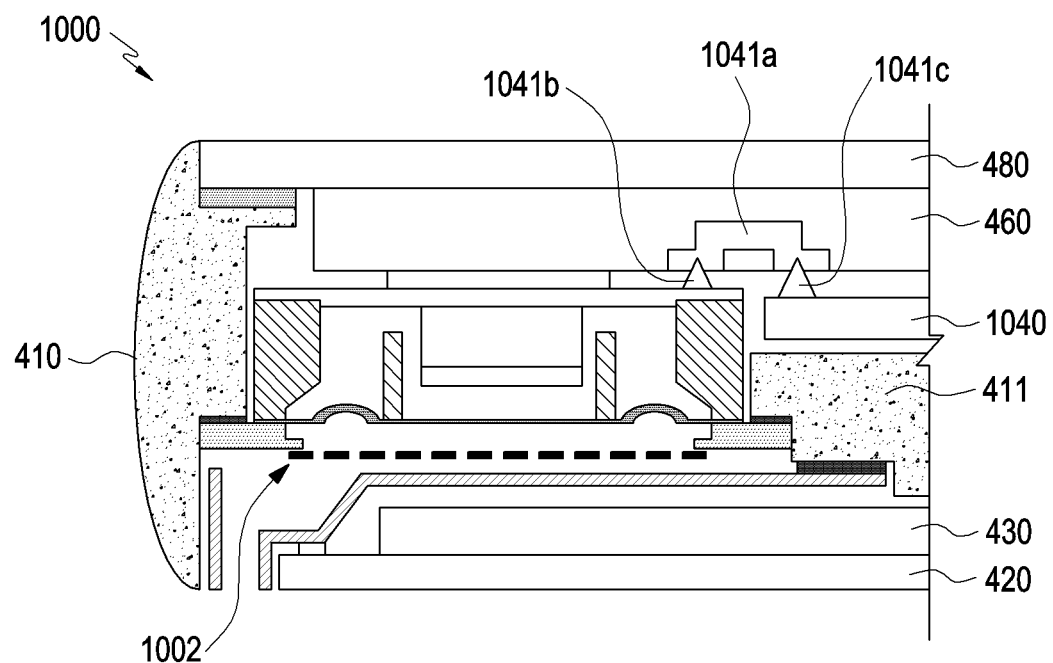
FIG. 14, FIG. 15, and FIG. 16 are cross-sectional views illustrating an electronic device, as modified, according to an embodiment.
Figure 15:
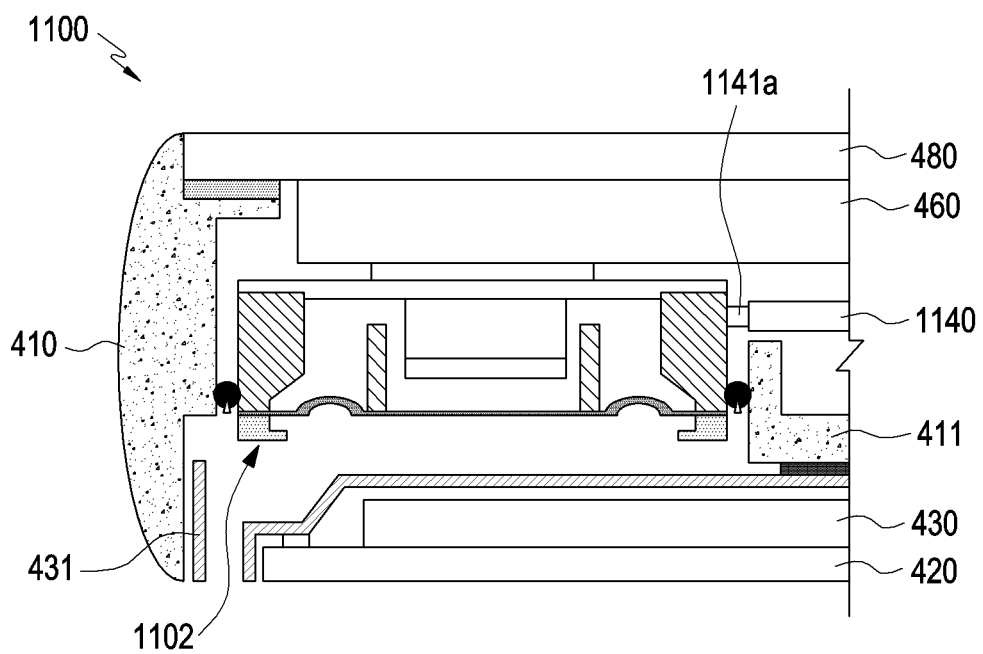
Figure 16:
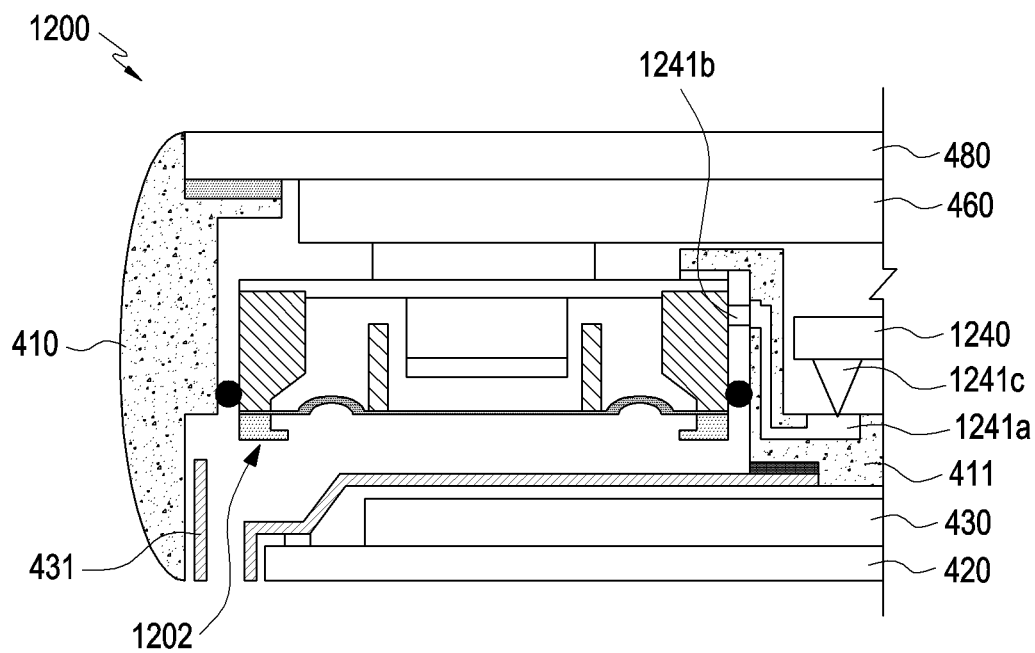

FIGS. 14 to 16 are cross-sectional views illustrating electronic devices 1000, 1100, and 1200, as modified, according to an embodiment.

Referring to FIG. 14, an electronic device 1000 may include a plurality of connecting members 1041b and 1041c and a conductive member 1041a electrically connecting an speaker module 1002 with a circuit board 1040. According to an embodiment, the conductive member 1041a may be disposed in a second supporting member 460 (e.g., the second supporting member 460 of FIG. 3) by such a process as, e.g., insert molding, and a portion thereof may be exposed to face the speaker module 1002 or the circuit board 1040. The connecting members 1041b and 1041c may be disposed on the speaker module 1002 and the circuit board 1040, respectively and may be implemented as C-clips, pogo pins, or conductive tapes. According to an embodiment, the conductive member 1041a may have a leaf spring structure. When the conductive member 1041a has a leaf spring structure, it may include a flat center portion which is disposed in the second supporting member 460 and elastic portions bent at both ends of the center portion and protruding to the outside of the second supporting member 460. According to an embodiment, when the conductive member 1041a has a leaf spring structure, the elastic portions may mechanically or electrically contact the speaker module 1002 or the circuit board 1040. For example, when the conductive member 1041a has a leaf spring structure, the speaker module 1002 may be electrically connected with the circuit board 1040 although the connecting members 1041b and 1041c are not disposed.

Referring to FIG. 15, an electronic device 1100 may include a contact pad (not shown) provided on the outer side surface of the speaker module 1102, and an end of the circuit board 1140 may be disposed adjacent to the outer side surface of the speaker module 1102. According to an embodiment, a connecting member 1141a, e.g., a C-clip, pogo pin, or conductive tape, may be disposed between the contact pad and the circuit board 1140, electrically connecting the speaker module 1102 to the circuit board 1140.

Referring to FIG. 16, a structure of a predetermined shape (e.g., a portion of the first supporting member 411) may be interposed between a speaker module 1202 and a circuit board 1240 inside an electronic device 1200. According to an embodiment, a conductive member 1241a may be disposed in the first supporting member 411. An end of the conductive member 1241a may be exposed to the exterior of the first supporting member 411 and be disposed to face the outer side surface of the speaker module 1202. The opposite end of the conductive member 1241a may be exposed to the exterior of the first supporting member 411 and be disposed to face a portion of the circuit board 1240.

According to an embodiment, as the electronic device 1200 includes a plurality of connecting members 1241b and 1241c, the speaker module 1202 may be electrically connected to the conductive member 1241a and/or the circuit board 1240 may be electrically connected to the conductive member 1241a. For example, the speaker module 1202 may be electrically connected with the circuit board 1240 through the conductive member 1241a and the connecting members 1241b and 1241c. According to an embodiment, one of the connecting members 1241b and 1241c may be provided between the contact pad of the speaker module 1202 and one end of the conductive member 1241a to electrically connect the speaker module 1202 with the conductive member 1241a. The other one of the connecting members 1241b and 1241c may be provided between the circuit board 1240 and the conductive member 1241a to electrically connect the conductive member 1241a with the circuit board 1240. The connecting members 1241b and 1241c may include C-clips, pogo pins, or conductive tapes.

Figure 17:
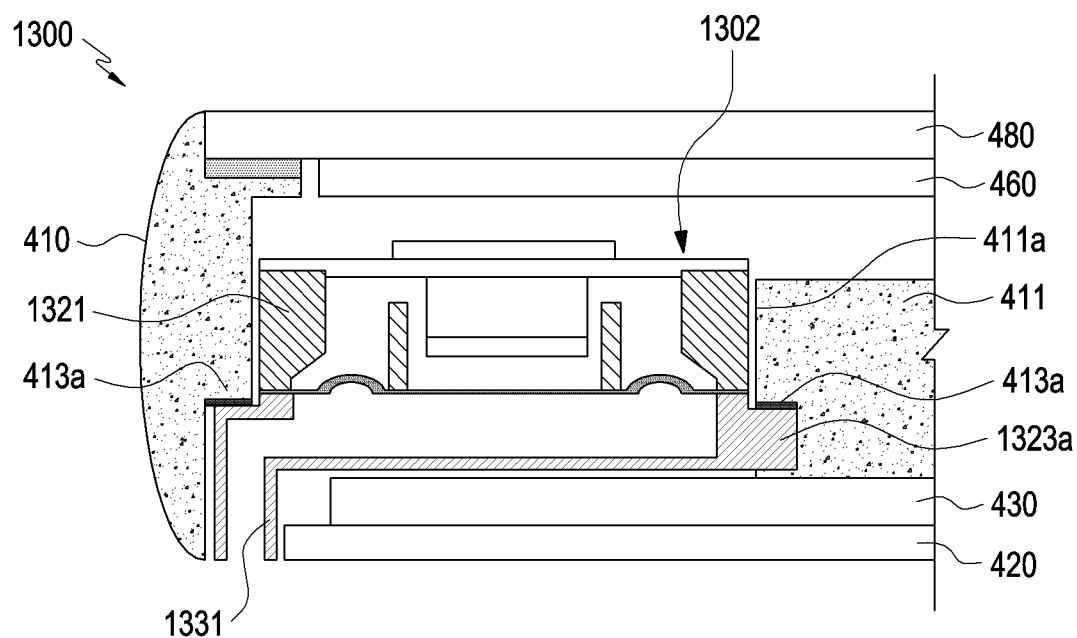
FIG. 17 and FIG. 18 are cross-sectional views illustrating an example in which a duct member and a speaker module are integrally formed with each other in an electronic device according to an embodiment.
Figure 18:
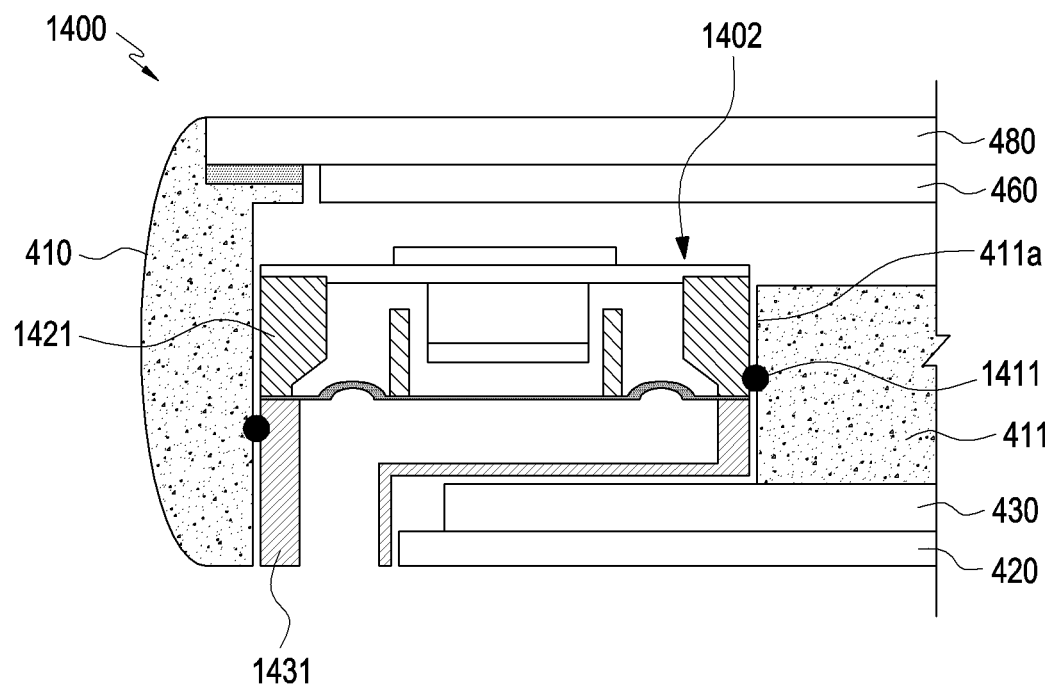

FIG. 17 and FIG. 18 are cross-sectional views illustrating an example in which a duct member 1331 or 1431 and a speaker module 1302 or 1402 are integrally formed with each other in an electronic device 1300 or 1400 according to an embodiment.

Referring to FIG. 17, according to an embodiment, in an electronic device 1300, a duct member 1331 may be integrally formed with a speaker module 1302. For example, the duct member 1331 may be mounted on the casing 1321 of the speaker module 1302 to thereby replace the first cover member 423 of FIG. 4 while providing a sound travel path (e.g., the sound travel path A of FIG. 5) to the speaker hole 114. According to an embodiment, the duct member 1331 may include a flange 1323a (e.g., the flange 423a of FIG. 4) extending from the outer side surface thereof, and a portion of the outer side surface of the flange 1323a or the duct member 1331 may be attached to the first supporting member 411 or the side bezel structure 410 by the adhesive member 413a. The adhesive member 413a may form a waterproof structure between the first supporting member 411 and the speaker module 1302 or between the side bezel structure 410 and the speaker module 1302.

Referring to FIG. 18, an electronic device 1400 may include a duct member 1431 which is mounted on the casing 1421 of the speaker module 1402 to thereby replace the first cover member 423 of FIG. 9. For example, the duct member 1431 may be mounted on the casing 1421 of the speaker module 1402 to thereby provide a sound travel path (e.g., the sound travel path A of FIG. 5) to the speaker hole 114. According to an embodiment, a waterproof structure, e.g., an O-ring 1411, may be interposed between the outer side surface of the duct member 1431 and the inner wall of the receiving hole 411a. For example, the O-ring 1411 may fasten the speaker module 1402 in the receiving hole 411a while forming a waterproof structure between the first supporting member 411 and the speaker module 1402 or between the side bezel structure 410 and the speaker module 1402.

Figure 19:
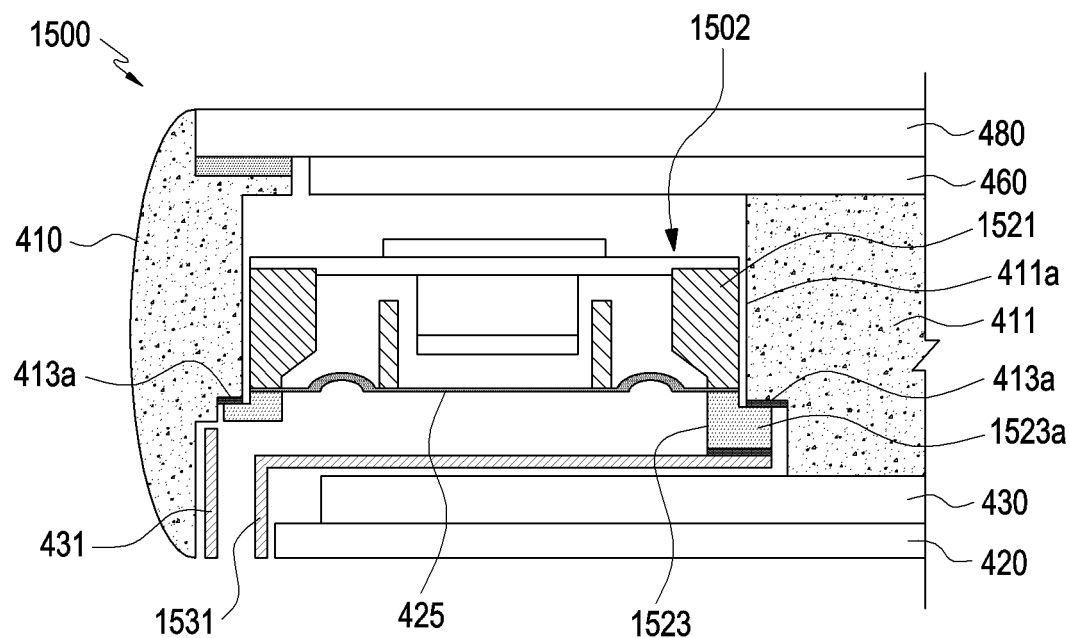
FIG. 19 and FIG. 20 are cross-sectional views illustrating an example structure in which a duct member is assembled with a speaker module in an electronic device according to an embodiment.
Figure 20:
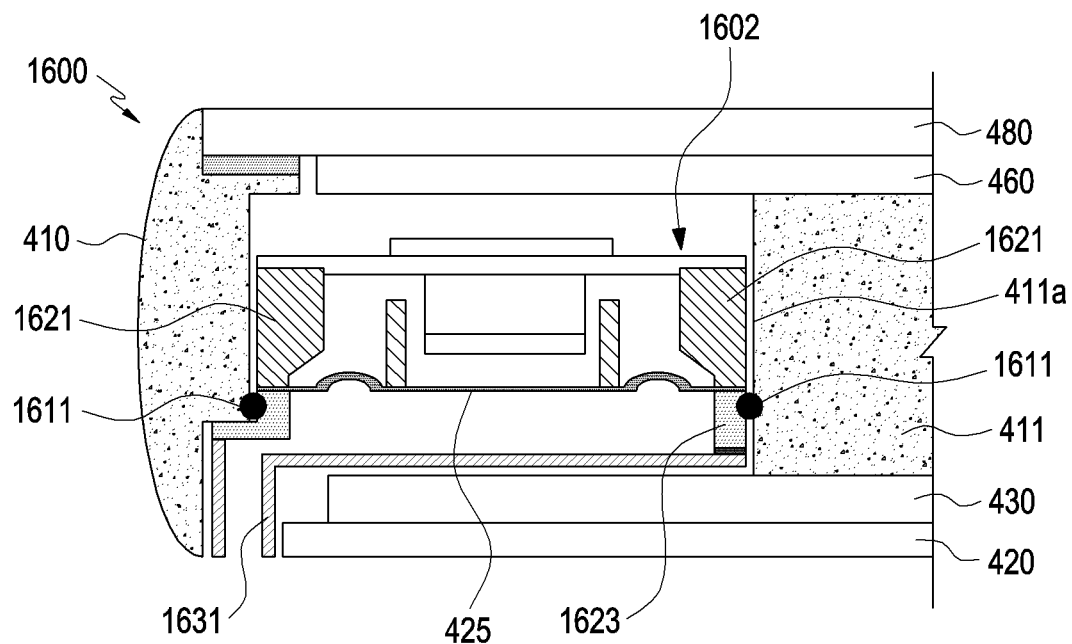

FIG. 19 and FIG. 20 are cross-sectional views illustrating an example in which a duct member 1531 or 1631 is assembled with a speaker module 1502 or 1602 in an electronic device 1500 or 1600 according to an embodiment.

Referring to FIG. 19, a speaker module 1502 of an electronic device 1500 may include a casing 1521 (e.g., the casing 421 of FIG. 4) and a first cover member 1523 (e.g., the first cover member 423 of FIG. 4) having a flange 1523a formed on an outer side surface thereof. According to an embodiment, the flange 1523a may be attached onto one surface of the first supporting member 411 around the receiving hole 411a by the adhesive member 413a. According to an embodiment, the duct member 1531 may be coupled with the first cover member 1523 and be disposed to directly face the diaphragm 425 of the speaker module 1502. For example, a portion of the duct member 1531 may be disposed to replace a portion of the first cover member 423 of FIG. 4.

Referring to FIG. 20, a speaker module 1602 of an electronic device 1600 may include a casing 1621 (e.g., the casing 421 of FIG. 7) and a first cover member 1623 (e.g., the first cover member 423 of FIG. 7). According to an embodiment, the duct member 1631 may be coupled with the first cover member 1623 and be disposed to directly face the diaphragm 425 of the speaker module 1602. For example, a portion of the duct member 1631 may be disposed to replace a portion of the first cover member 423 of FIG. 7. According to an embodiment, the electronic device 1600 may include an O-ring 1611 interposed between the outer side surface of the duct member 1631 and the inner wall of the receiving hole 411a. For example, the O-ring 1611 may form a waterproof structure between the speaker module 1602 and the first supporting member 411 or between the speaker module 1602 and the side bezel structure 410.

Figure 21:
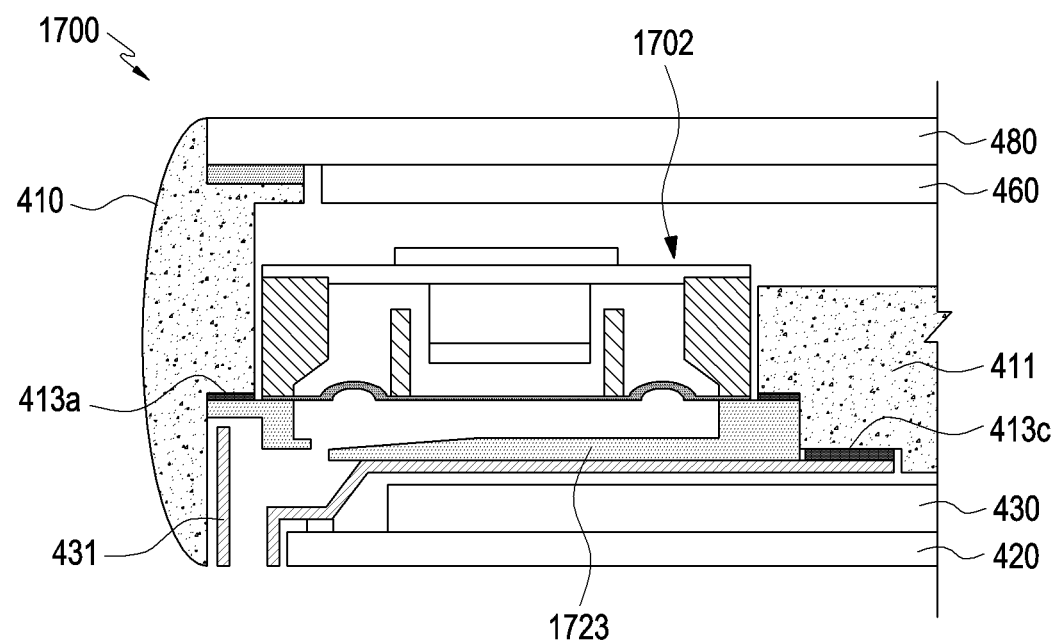
FIG. 21, FIG. 22, and FIG. 23 are cross-sectional views illustrating a cover member, as modified, in a speaker module of an electronic device according to an embodiment.
Figure 22:
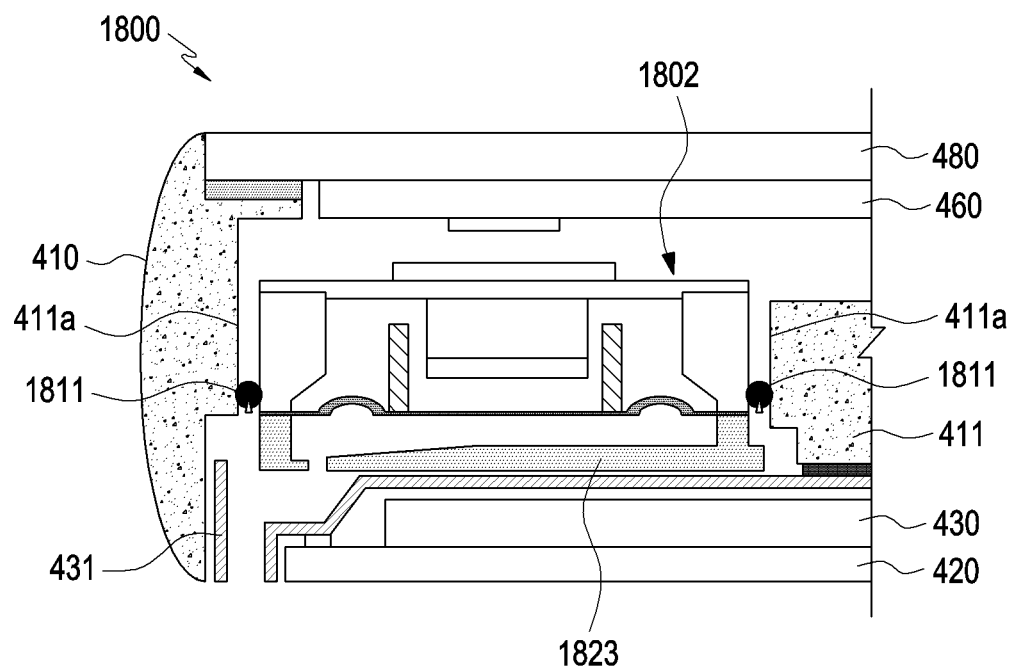
Figure 23:
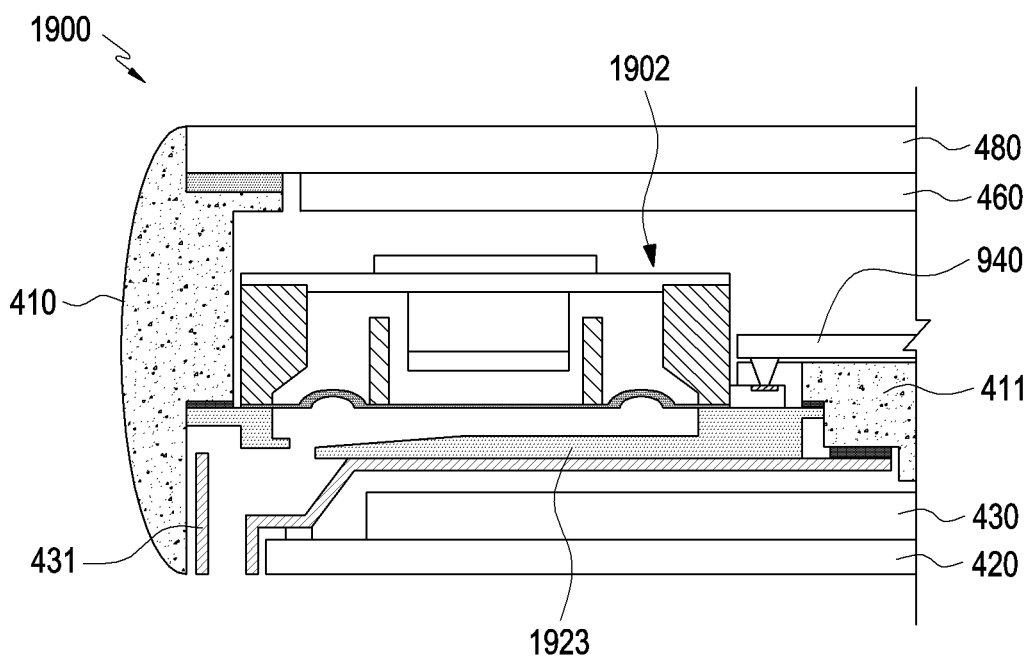

FIGS. 21 to 23 are cross-sectional views illustrating a cover member (e.g., the first cover member 423 of FIG. 4, 7, or 10), as modified, in a speaker module of an electronic device 1700, 1800, or 1900 according to an embodiment.

Referring to FIG. 21, in a speaker module 1702 of an electronic device 1700, a first cover member 1723 may be formed to differ from the first cover member 423 of FIG. 4 or 5 in light of the volume of the internal space or the area where sounds may be emitted. For example, as the first cover member 1723 is varied in thickness, the internal space of the speaker module 1702 (or the first cover member 1723) may be reduced as compared with the first cover member 423, and the area through which sounds may be transmitted in the first cover member 1723 may be smaller than the first cover member 423 of FIG. 4. For example, in the surface facing the front surface of the electronic device 1700, the area where sounds may be emitted through the first cover member 1723 may be smaller than the first cover member 423 of FIG. 4. According to an embodiment, the sound properties of the speaker module 1702 may be adjusted depending on the shape of the first cover member 1723 or the area where sounds may be emitted, and this may be properly designed fitting the specifications utilized for the electronic device.

Referring to FIG. 22, in a speaker module 1802 of an electronic device 1800, a first cover member 1823 may be formed to differ from the first cover member 423 of FIG. 7 in light of the volume of the internal space or the area where sounds may be emitted. For example, the thickness of the first cover member 1823 or the area where sounds may be emitted may be reduced as compared with the first cover member 423 of FIG. 7. For example, the sound properties of the speaker module 1802 may be adjusted depending on the shape of the first cover member 1823, and this may be properly designed fitting the specifications utilized for the electronic device. According to an embodiment, the speaker module 1802 may be fastened to the inner wall of the receiving hole 411a by an O-ring 1811 (e.g., the O-ring 611 of FIG. 7). The O-ring 1811 may form a waterproof structure between the speaker module 1802 and the inner wall of the receiving hole 411a.

Referring to FIG. 23, in a speaker module 1902 of an electronic device 1900, a first cover member 1923 may be formed to differ from the first cover member 423 of FIG. 10 in light of the volume of the internal space or the area where sounds may be emitted. For example, the thickness of the first cover member 1923 or the area where sounds may be emitted may be reduced as compared with the first cover member 423 of FIG. 10. For example, the sound properties of the speaker module 1902 may be adjusted depending on the shape of the first cover member 1923, and this may be properly designed fitting the specifications utilized for the electronic device.

A configuration in which the duct member is attached to the first supporting member (as shown in, e.g., FIG. 4, 7, or 10) or at least partially replaces the first cover member of the speaker module (as shown in, e.g., FIGS. 17 to 20) has been described above in connection with the prior embodiments. As in the embodiment of FIGS. 21 to 23, in the configuration where the sound emission area of the first cover member is reduced, the duct member may be mounted in various positions. The structure of the duct member being mounted in the structure of the reduced sound emission area in the first cover member is described below with reference to FIGS. 24 to 26.

Figure 24:
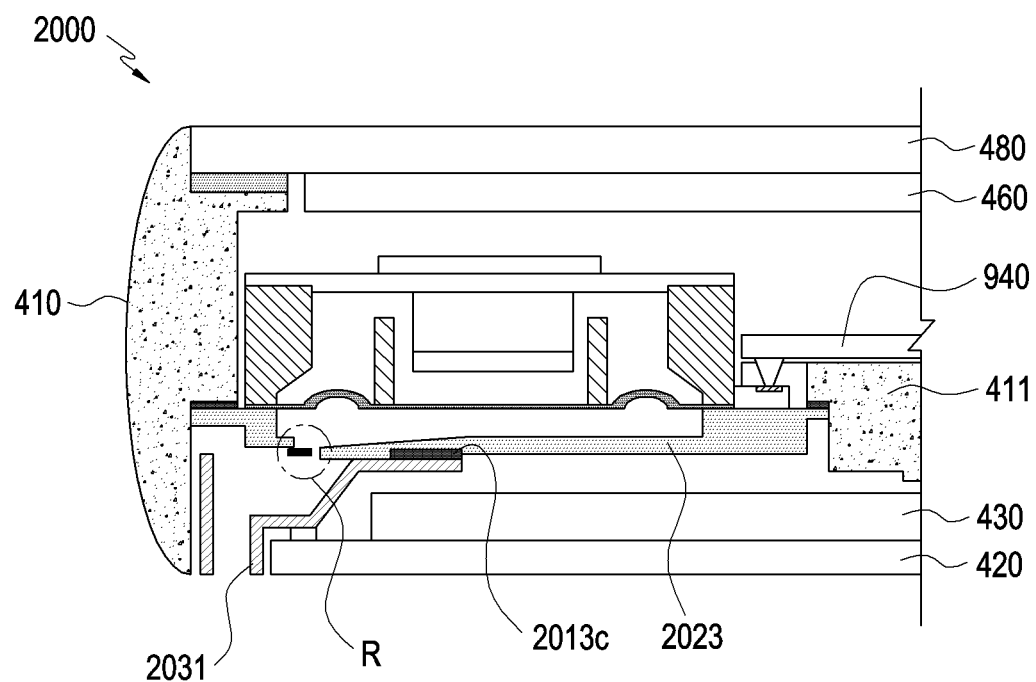
FIG. 24, FIG. 25, and FIG. 26 are cross-sectional views illustrating a duct member, as modified, in an electronic device according to an embodiment.
Figure 25:
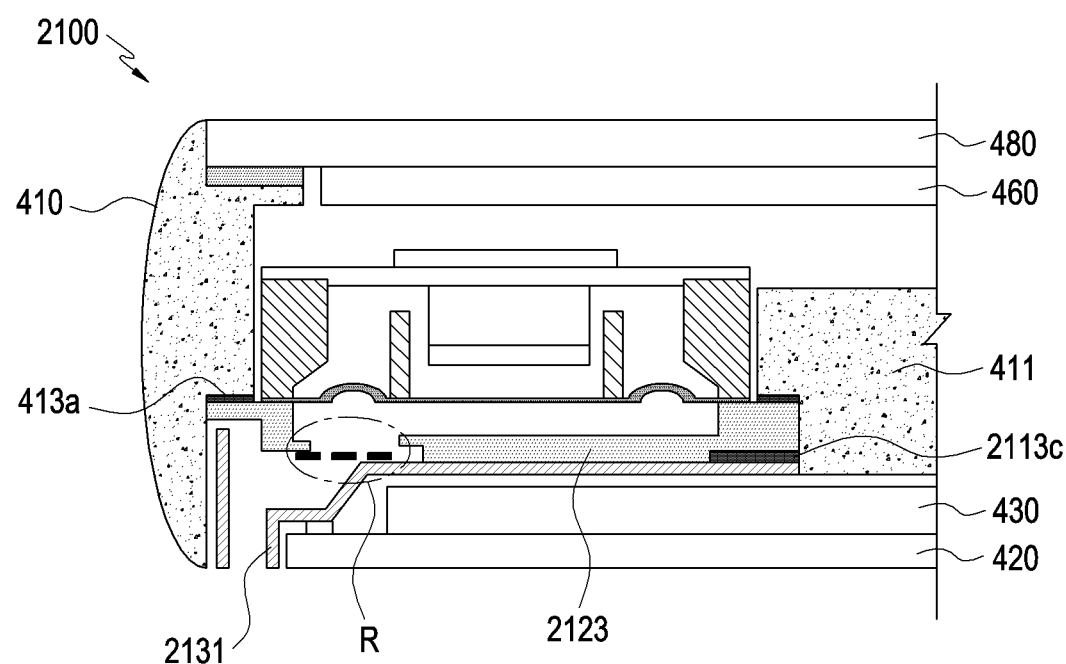
Figure 26:
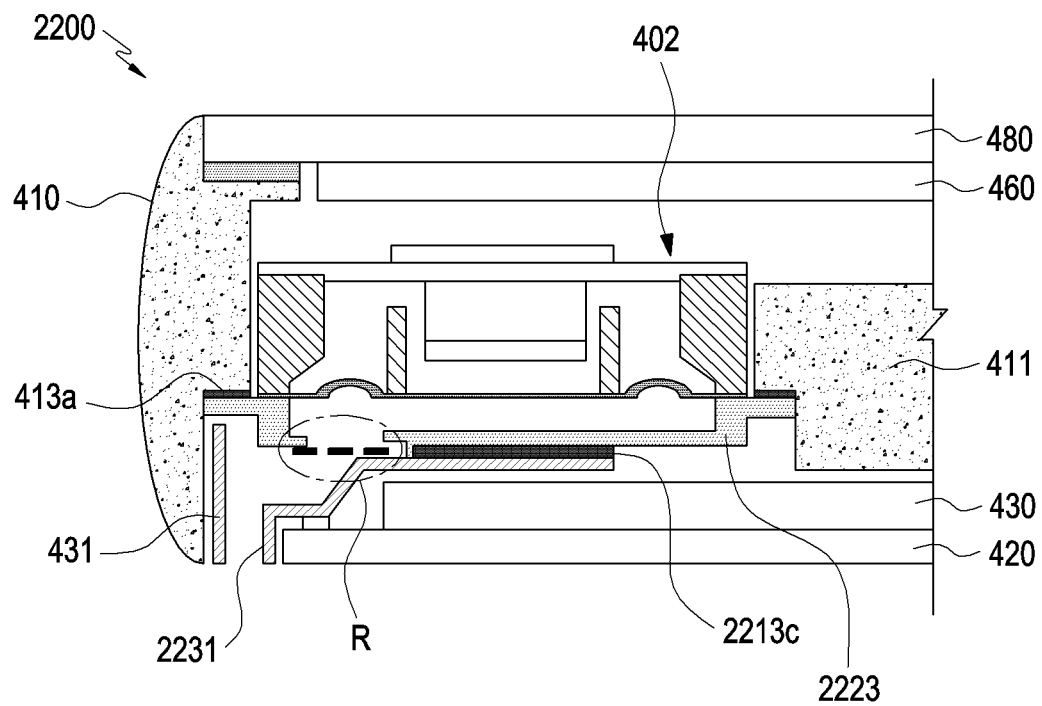

FIGS. 24, 25, and 26 are cross-sectional views illustrating a duct member 2031, 2131, or 2231, as modified, in an electronic device 2000, 2100, or 2200 according to an embodiment.

In the structure of the reduced sound emission area in the first cover member (e.g., the embodiment of FIGS. 21 to 23), the duct member 2031, 2131, or 2231 may be mounted in further diversified positions as shown in FIGS. 24 to 26. Referring to FIG. 24, the duct member 2031 may be attached to the outer side surface of the first cover member 2023 by the adhesive member 2013c in the position adjacent to the sound emission area R while providing a sound travel path (e.g., the sound travel path A of FIG. 5) connected to the sound emission area R of the first cover member 2023. Referring to FIG. 25, as connected to the sound emission area R of the first cover member 2123, the duct member 2131 may have substantially a shape of facing the outer side surface of the first cover member 2123 in an entire area departing from the sound emission area R. For example, in any position of the area departing from the sound emission area R, the duct member 2131 may be attached to the outer side surface of the first cover member 2123 by the adhesive member 2113c. FIG. 25 illustrates a configuration in which the duct member 2131 is attached adjacent to the edge of the first cover member 2123 while departing from the sound emission area R. Referring to FIG. 26, the duct member 2231 may be attached to the outer side surface of the first cover member 2223 by the adhesive member 2213c in the position adjacent to the sound emission area R while providing a sound travel path connected to the sound emission area R of the first cover member 2223. According to an embodiment, when the first cover member 2223 is formed in a thinner thickness, the sound pressure produced by the diaphragm (e.g., the diaphragm 425 of FIG. 5) may vibrate the first cover member 2223. The duct member 2231 may be attached to the first cover member 2223 in a larger area than the duct member 2131 of FIG. 24, thereby suppressing resonance or vibrations of the first cover member 2223.

Figure 27:
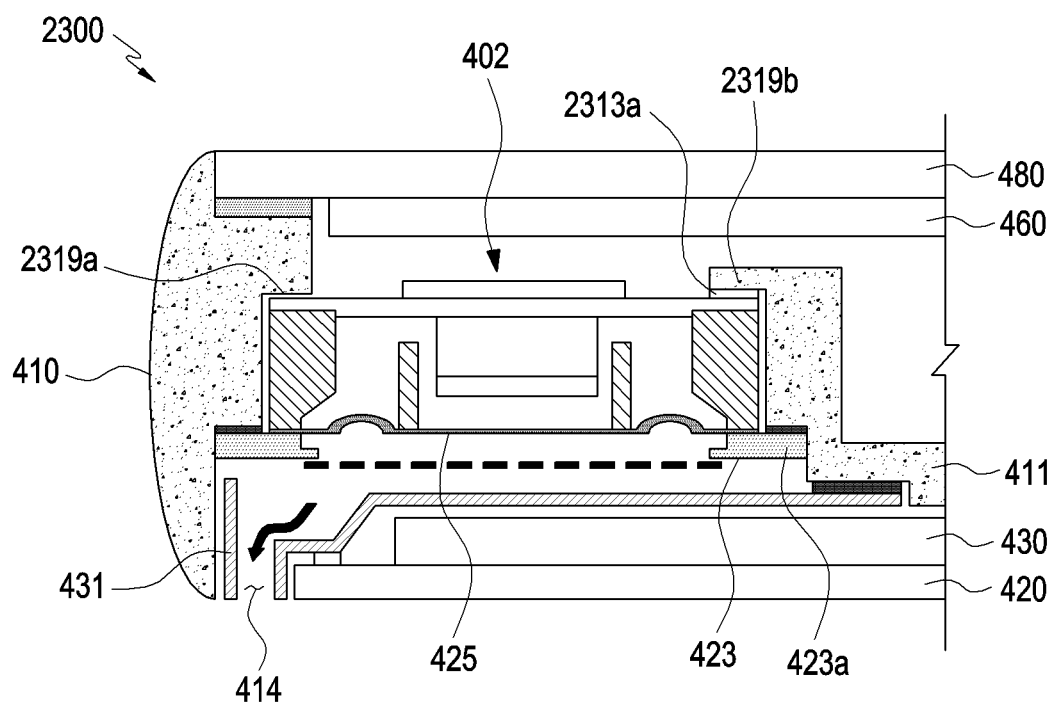
FIG. 27 and FIG. 28 are cross-sectional views illustrating a speaker module supporting structure, as modified, in an electronic device according to an embodiment.
Figure 28:
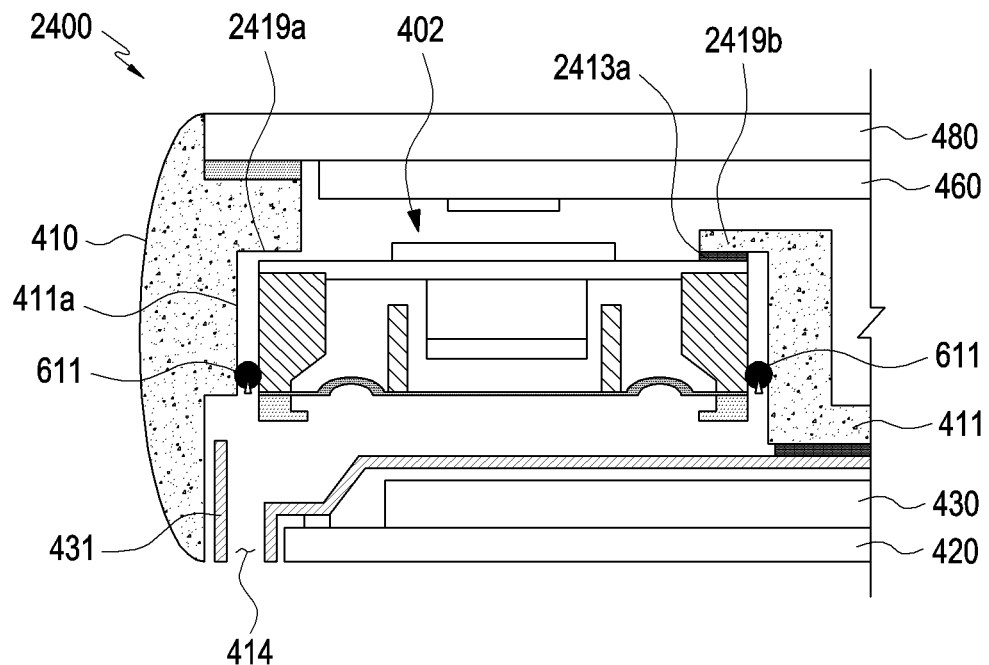

FIGS. 27 and 28 are cross-sectional views illustrating a supporting structure of a speaker module 402, as modified, in an electronic device 2300 or 2400 according to an embodiment.

Referring to FIGS. 27 and 28, in an electronic device 2300 or 2400, a speaker module 402 or 602 may be mounted on a first supporting member 411 or side bezel structure 410 using a flange 423a of the speaker module 402 or 602 or, if it lacks a flange, an O-ring 611. In mounting the speaker module 402 or 602, the electronic device 2300 or 2400 includes at least one stepped portion 2319a and 2319b or 2419a and 2419b, thereby setting a position of assembly of the speaker module 402 or 602.

According to an embodiment, the electronic device 2300 or 2400 may include a first stepped portion 2319a or 2419a formed in the side bezel structure 410 and a second stepped portion 2319b or 2419b formed on the opposite surface of the first supporting member 411. According to an embodiment, the first stepped portion 2319a or 2419a and the second stepped portion 2319b or 2419b may extend along the periphery of the receiving hole 411a and connect with each other. For example, although shown in FIGS. 27 and 28 to be formed independently from each other, the first stepped portion 2319a or 2419a and the second stepped portion 2319b or 2419b may form a closed loop surrounding the receiving hole 411a on the opposite surface of the first supporting member 411.

According to an embodiment, the speaker module 402 or 602 may enter the receiving hole 411a on one surface of the first supporting member 411 so that the rear surface of the speaker module 402 or 602 may be supported by the first stepped portion 2319a or 2419a or the second stepped portion 2319b or 2419b. According to an embodiment, the adhesive member 413a may be provided between the flange 423a and the first supporting member 411 to thereby form a waterproof structure, or the O-ring 611 may be interposed between the outer side surface of the speaker module 602 and the inner wall of the receiving hole 411a to thereby form a waterproof structure.

According to an embodiment, the speaker module 402 or 602 may be positioned so that a portion (e.g., an edge) of the rear surface thereof faces the first stepped portion 2319a or 2419a or the second stepped portion 2319b or 2419b, and another adhesive member 2313a or 2413a may be provided between the rear surface of the speaker module 402 or 602 and the first stepped portion 2319a or 2419a or between the rear surface of the speaker module 402 or 602 and the second stepped portion 2319b or 2419b. For example, in the state of having been assembled in the receiving hole 411a, the speaker module 402 or 602 may be attached to the first stepped portion 2319a or 2419a or the second stepped portion 2319b or 2419b.

Figure 29:
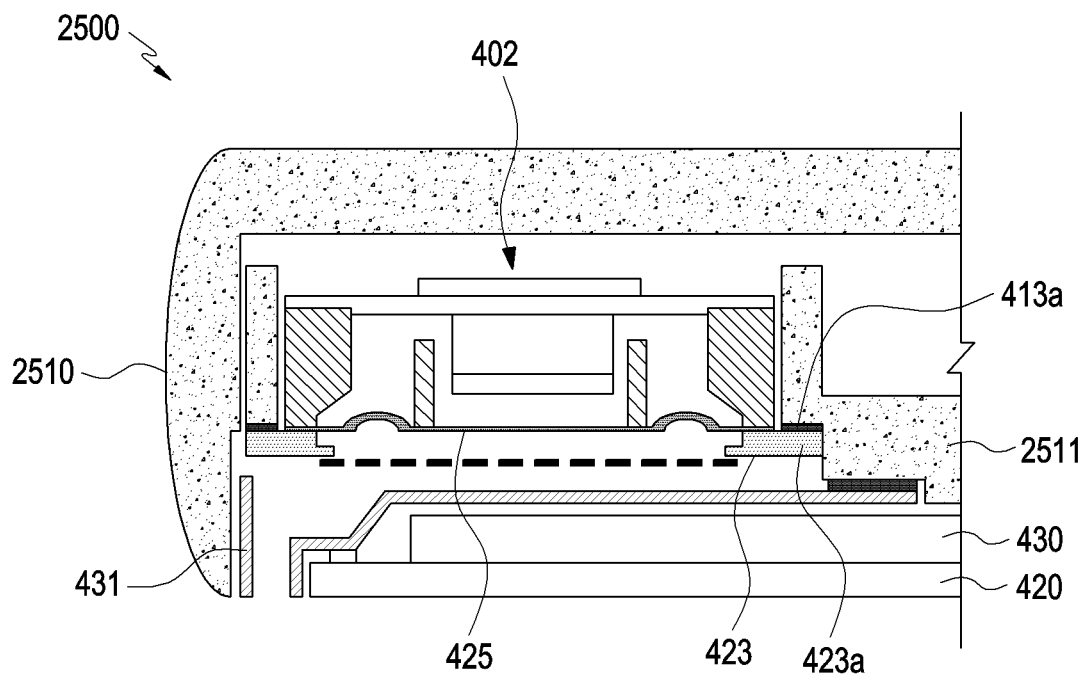
FIG. 29 is a cross-sectional view illustrating an electronic device according to an embodiment.

FIG. 29 is a cross-sectional view illustrating an electronic device 2500 according to an embodiment.

Referring to FIG. 29, an electronic device 2500 may include a first supporting member 2511 assembled in an internal space of a side bezel structure 2510. For example, the first supporting member 2511 may be prepared separately from the side bezel structure 2510 and, with the speaker module 402 mounted, it may be assembled with the side bezel structure 2510. According to an embodiment, the side bezel structure 2510 may be integrally formed with the rear plate 480 or second supporting member 460 of FIG. 4. Alternatively, the speaker module 402 may be assembled in the receiving hole formed through the first supporting member 2511. For example, the speaker module 402 may enter from one surface of the first supporting member 2511 to the receiving hole.

According to an embodiment, the speaker module 402 may include a flange 423a, and the flange 423a may be attached to the first supporting member 2511 by the adhesive member 413a. According to an embodiment, the electronic device 2500 may include the O-ring 611 of FIG. 7 or the second stepped portion 2319b of FIG. 27. For example, the electronic devices or speaker modules described above in connection with the above embodiments may be selectively combined to implement an electronic device which is not directly shown in the drawings, according to an embodiment.

Figure 30:
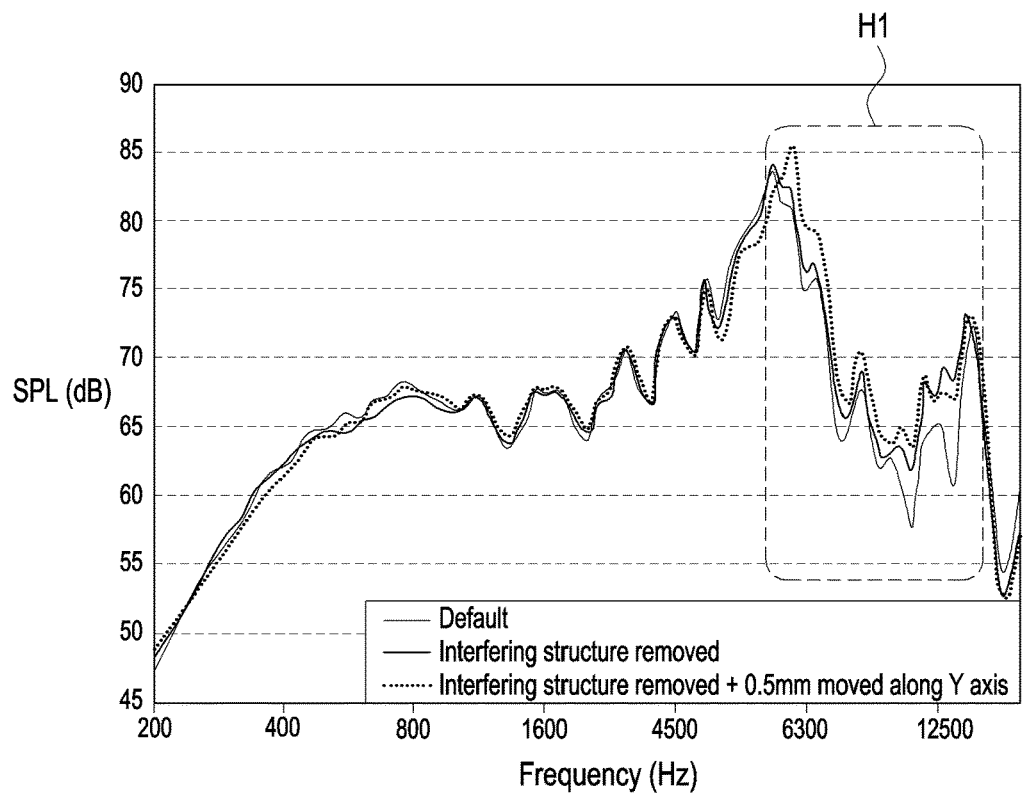
FIG. 30 is a graph illustrating the sound pressure of an electronic device, as measured according to an embodiment.
Figure 31:
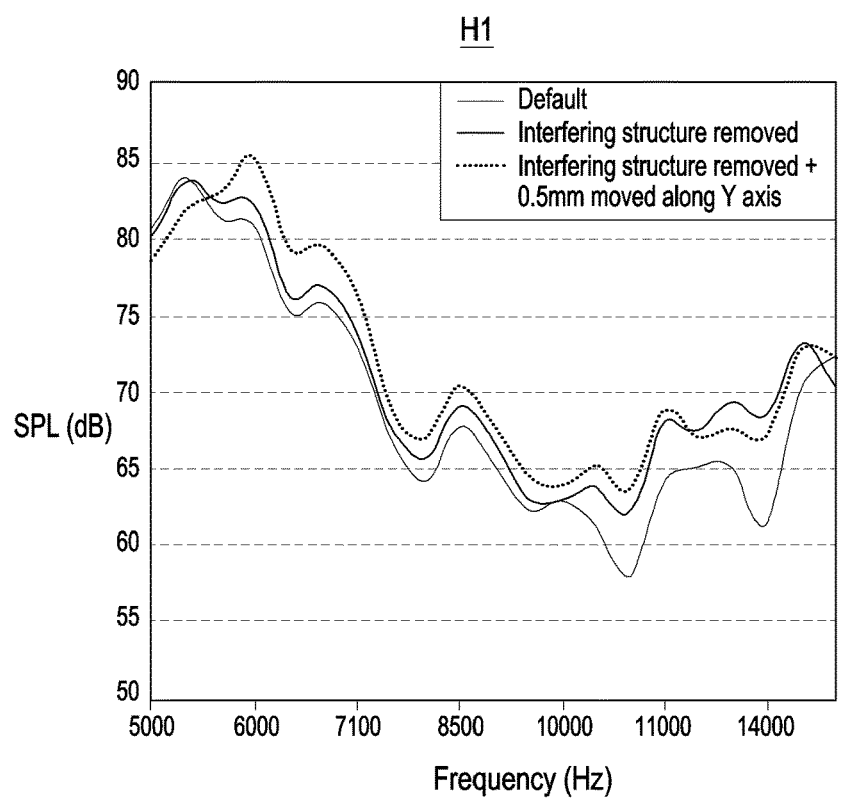
FIG. 31 is a graph illustrating an enlarged portion H1 in the graph of FIG. 30.
Figure 32:
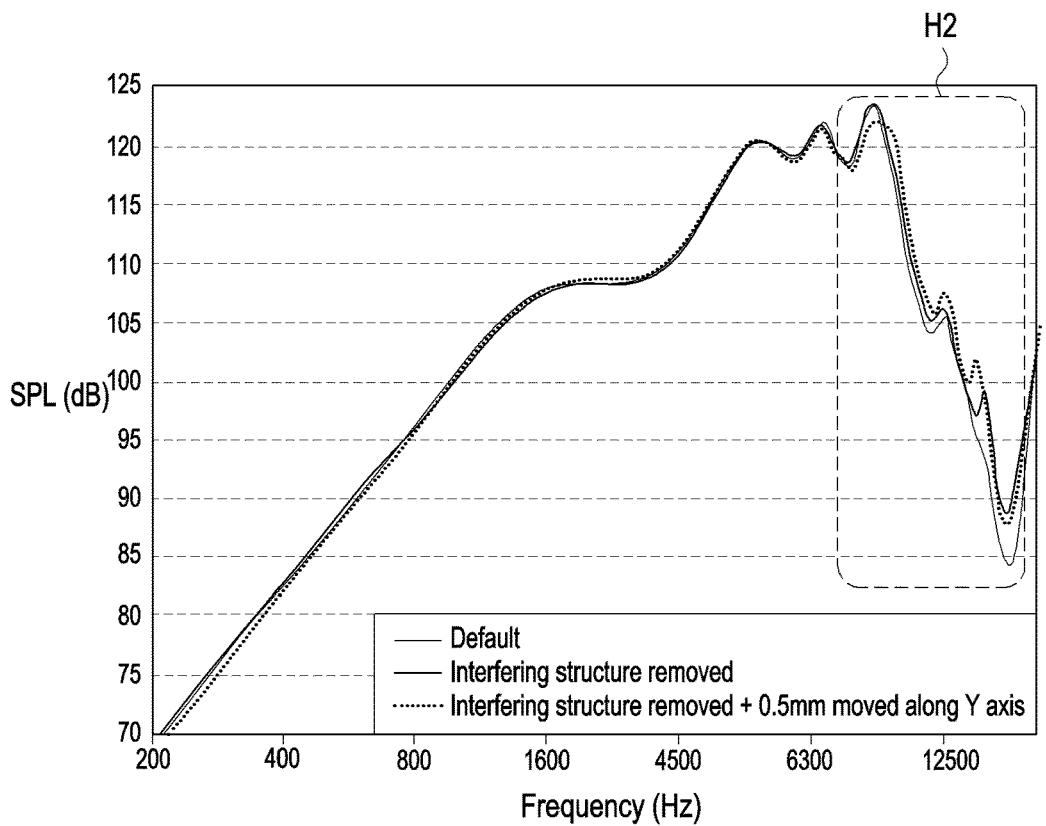
FIG. 32 is a graph illustrating the sound pressure of an electronic device, as measured according to an embodiment.
Figure 33:
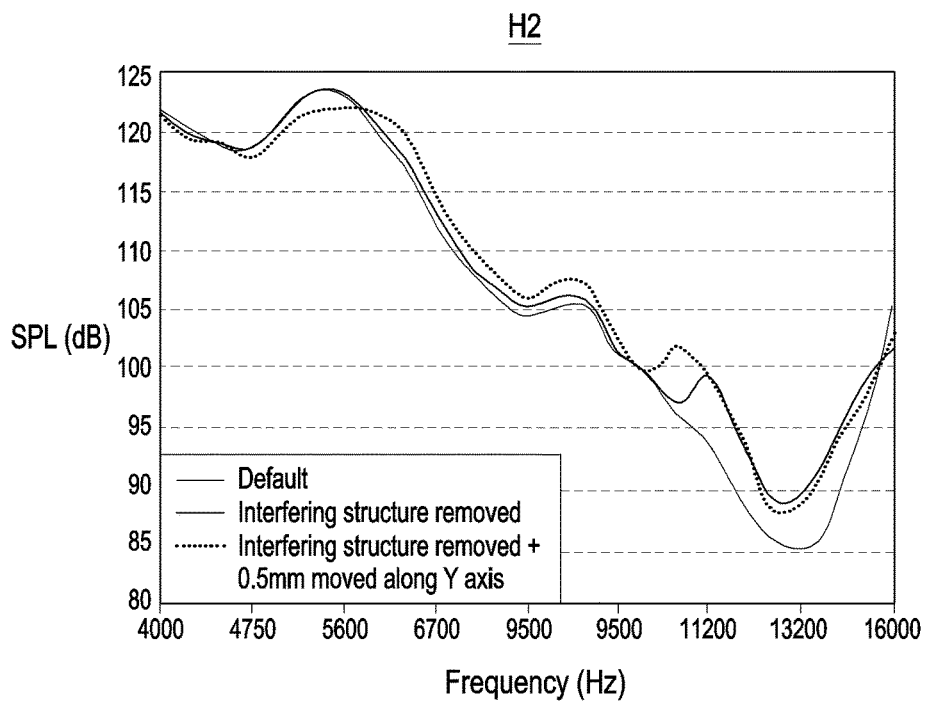
FIG. 33 is a graph illustrating an enlarged portion H2 in the graph of FIG. 32.

FIG. 30 is a graph illustrating the sound pressure of an electronic device (e.g., the electronic device 400 of FIG. 5), as measured according to an embodiment. FIG. 31 is a graph illustrating an enlarged portion H1 in the graph of FIG. 30. FIG. 32 is a graph illustrating the sound pressure of an electronic device (e.g., the electronic device 600 of FIG. 7), as measured according to an embodiment. FIG. 33 is a graph illustrating an enlarged portion H2 in the graph of FIG. 32.

FIGS. 30 to 33 illustrate graphs of the sound pressure levels measured in three measurement environments under different conditions (e.g., different internal structures of the electronic device). For example, the results of measuring the sound pressure level in the environment where an interfering structure is on the sound travel path A and in the structure where the area of attachment does not overlap the speaker module are shown in the graphs denoted with 'Default' in FIGS. 30 to 33. 'Structure where the area of attachment does not overlap the speaker module' may mean that the length denoted with reference character 'Y' is substantially zero. Further, 'interfering structure' may mean a structure in which a portion of the first supporting member is positioned in the sound travel path A of FIG. 5 to thereby set, e.g., the position of the speaker module. The graphs denoted with 'interfering structure removed' in FIGS. 30 to 33 show the sound pressure levels measured, with the structure removed from the sound travel path A, and without an overlap with another structure or shape, e.g., the area of attachment and the speaker module. The graphs denoted with 'interfering structure removed +0.5 mm moved along Y axis' in FIGS. 30 to 33 show the sound pressure levels measured, with the structure from the sound travel path A, in the state of the length (e.g., the width in which the area of attachment overlaps the speaker module) denoted with reference character 'Y' being 0.5 mm. For example, the 'state of the length denoted with reference character 'Y' being 0.5 mm' may mean that the area of attachment (e.g., the waterproofing member 413b of FIG. 5) overlaps the speaker module in a length of at least 0.5 mm as viewed from above the front or rear surface of the electronic device. For example, the graphs denoted with 'interfering structure removed +0.5 mm moved along Y axis' may represent the sound pressure levels measured, with the speaker module disposed 0.5 mm closer to the top end or the speaker hole of the electronic device than in the structure of the 'Default' state.

Referring to FIGS. 30 to 33, in the sound ranges before or after about 10 kHz, although a slight difference may be caused depending on frequencies, the structure in which the interfering structure has been removed and the speaker module is disposed closer to the speaker hole presents a 2-3 dB enhanced sound pressure level as compared with the structure in which only the removal of the interfering structure has been performed and an enhancement of about 5 dB as compared with the structure with the 'Default' state.

Given that typical multimedia (e.g., audio or video) or broadcast sounds are output in ranges not more than 10 kHz or not significantly departing from 10 kHz, the sound ranges before or after 10 kHz may be substantially high ranges to listeners. For example, the electronic device or speaker module-equipped structure may enhance the quality of high-range sounds (e.g., sound pressure) according to certain embodiments. According to an embodiment, the structure in which the speaker module is assembled with the first supporting member on the front surface of the electronic device may reduce the distance (e.g., the length of the sound travel path) between the speaker module and the speaker hole or simplify the shape of the sound travel path. For example, according to certain embodiments, the electronic device or speaker module-equipped structure may prevent attenuation of high-range sounds, which are highly straightforward.

As set forth above, according to an embodiment, an electronic device (e.g., the electronic device 400, 600, or 900 of FIG. 4, 7, or 10) may include a side bezel structure (e.g., the side bezel structure 410 of FIG. 4, 7, or 10) at least partially surrounding a space between a front surface (e.g., the first surface 110A of FIG. 1) and a rear surface (e.g., the second surface 110B of FIG. 2) of the electronic device, a first supporting member (e.g., the first supporting member 411 of FIG. 4, 7, or 10) disposed in an area or space surrounded by the side bezel structure, a display (e.g., the display 430 of FIG. 4, 7, or 10) disposed on one surface of the first supporting member to output a screen in a front direction of the electronic device, and a speaker module (e.g., the speaker module 402, 602, or 902 of FIG. 4, 7, or 10) with at least a portion disposed between the first supporting member and the display or between the side bezel structure and the display.

According to an embodiment, the first supporting member may be integrally formed with the side bezel structure.

According to an embodiment, the electronic device may further include a speaker hole (e.g., the speaker hole 414 of FIG. 4, 7, or 10) formed in a front surface of the electronic device at a side of the display. The speaker module may be configured to emit a sound to an outside of the electronic device through the speaker hole.

According to an embodiment, the electronic device may further include a duct member (e.g., the duct member 431 of FIG. 4, 7, or 10) connecting the speaker hole with the speaker module. The sound emitted from the speaker module may travel through the duct member to the speaker hole.

According to an embodiment, the duct member may be integrally formed with the speaker module.

According to an embodiment, the electronic device may further include a receiving hole (e.g., the receiving hole 411a of FIG. 4, 7, or 10) formed in the first supporting member. A portion of the speaker module may be received in the receiving hole.

According to an embodiment, the speaker module may include a flange (e.g., the flange 423a of FIG. 4) extending from an outer side surface. The flange may be coupled with the first supporting member around the receiving hole.

According to an embodiment, the electronic device may further include an adhesive member (e.g., the adhesive member 413a of FIG. 4) disposed around the receiving hole. The adhesive member may attach the flange to the first supporting member to form a waterproof structure between the speaker module and the first supporting member.

According to an embodiment, the speaker module may further include a screw hole (e.g., the screw hole 923b of FIG. 12) formed through the flange.

According to an embodiment, the speaker module may further include at least one contact pad (e.g., the contact pad 941a of FIG. 13) disposed to face a rear surface of the electronic device in an area where the flange is formed.

According to an embodiment, the electronic device may further include an O-ring (e.g., the O-ring 611 of FIG. 7) disposed in the receiving hole. The O-ring may be interposed between an inner wall of the receiving hole and an outer side surface of the speaker module to form a waterproof structure between the speaker module and the first supporting member.

According to an embodiment, the electronic device may further include a slit (e.g., the slit 711b of FIG. 8) formed in the O-ring and a reinforcing member (e.g., the reinforcing member 711c of FIG. 8) inserted into the slit.

According to an embodiment, the electronic device may further include a stepped portion (e.g., the stepped portion 2319a or 2319b of FIG. 27) formed in at least a portion of a periphery of the receiving hole on an opposite surface of the first supporting member. A rear surface of the speaker module may be supported by the stepped portion so that at least a portion of the speaker module is disposed between the stepped portion and the display.

According to an embodiment, a portion of an inner wall of the receiving hole may include a portion of an inner side surface of the side bezel structure. The stepped portion may be formed on the inner side surface of the side bezel structure.

According to an embodiment, the electronic device may further include a rear plate (e.g., the rear plate 480 of FIG. 4, 7, or 10) coupled with the side bezel structure while facing an opposite surface of the first supporting member and a waterproofing member (e.g., the waterproofing member 413b of FIG. 4) attaching an edge of the rear plate to the side bezel structure.

According to an embodiment, an electronic device includes a side bezel structure at least partially surrounding a space between a front surface and a rear surface of the electronic device, a first supporting member disposed in an area or space surrounded by the side bezel structure, a display disposed on one surface of the first supporting member to output a screen in a front direction of the electronic device, a rear plate coupled with the side bezel structure while facing an opposite surface of the first supporting member, a waterproofing member attaching the rear plate to the side bezel structure, and a speaker module including a flange disposed between the first supporting member and the display, such that the flange is attached to the first supporting member to form a waterproof structure between the flange and the first supporting member.

According to an embodiment, at least a portion of the speaker module may be disposed between a front surface of the electronic device and the waterproofing member.

According to an embodiment, the electronic device may further include an adhesive member attaching the flange to the first supporting member.

According to an embodiment, the electronic device may further include a receiving hole formed through the first supporting member. At least a portion of the speaker module may be received in the receiving hole, and the flange may be attached to the first supporting member around the receiving hole.

According to an embodiment, the speaker module may further include a casing at least partially received in the receiving hole and a cover member coupled to one surface of the casing and disposed to face a front surface of the electronic device. The flange may extend from an outer side surface of the casing or an outer side surface of the cover member.

As is apparent from the foregoing description, according to certain embodiments of the disclosure, as at least a portion of a speaker module is disposed between a first supporting member and a display, the speaker module is structured to be assembled in the direction from the front surface of the first supporting member to the rear surface. Thus, a better freedom of design and easier assembly may be achieved for the structure of assembly between other components (e.g., the side bezel structure and the rear plate) on the rear surface of the first supporting member. According to an embodiment, a sufficient area of attachment may be secured between the side bezel structure and the rear plate on the rear surface of the first supporting member, thus enhancing waterproof and dustproof capability.

According to an embodiment, the speaker module may be disposed closer to the top end of the electronic device regardless of the area of attachment between the side bezel structure and the rear plate. For example, the speaker module is placed closer to the sound output hole (e.g., the speaker hole disposed at one side of the display) for providing the other party's voice to the user when a voice phone call is in progress, thereby mitigating or preventing attenuation of the sound pressure on the sound travel path in the electronic device. For example, according to certain embodiments of the disclosure, the electronic device may provide enhanced sound quality to the user, as well as a stabilized coupling structure between other components.

While the disclosure has been shown and described with reference to example embodiments thereof, it will be apparent to those of ordinary skill in the art that various changes in form and detail may be made thereto without departing from the disclosure as defined by the following claims.

What is claimed is:

1. An electronic device, comprising:
a side bezel structure at least partially circumferentially surrounding a space defined between a front surface and a rear surface of the electronic device, the front surface of the electronic device defines a speaker hole disposed at a side area of a display;
a first supporting member disposed in the space;
the display disposed on one surface of the first supporting member as to output a screen towards a frontal direction of the electronic device;
a speaker module configured to emit a sound to an exterior of the electronic device through the speaker hole; and
an O-ring interposed between an inner wall of the first supporting member and an outer side surface of the speaker module, forming a waterproof structure between the speaker module and the first supporting member,
wherein a portion of the speaker module is disposed between the first supporting member and the display and another portion of the speaker module is disposed between the side bezel structure and the display.

2. The electronic device of claim 1, wherein the first supporting member is integrally formed with the side bezel structure.

3. The electronic device of claim 1, further comprising a duct member connecting the speaker hole with the speaker module, wherein the duct member defines a hollow through which sound emitted from the speaker module travels to the speaker hole and to the exterior of the electronic device.

4. The electronic device of claim 3, wherein the duct member is integrally formed with the speaker module.

5. The electronic device of claim 1, further comprising:
a slit formed in the O-ring; and
a reinforcing member inserted into the slit.

6. The electronic device of claim 1, further comprising:
a rear plate coupled with the side bezel structure and facing an opposite surface of the first supporting member; and
a waterproofing member coupling an edge of the rear plate to the side bezel structure.

7. An electronic device, comprising:
a side bezel structure at least partially circumferentially surrounding a space defined between a front surface and a rear surface of the electronic device;
a first supporting member disposed in the space and defining a receiving hole;
a display disposed on one surface of the first supporting member as to output a screen towards a frontal direction of the electronic device;
an adhesive member disposed around the receiving hole; and
a speaker module, at least a portion of the speaker module is disposed in the receiving hole,
wherein at least a portion of the speaker module is disposed between the first supporting member and the display or between the side bezel structure and the display,
wherein the speaker module includes a flange extending from an outer side surface, wherein the flange is coupled with the first supporting member around the receiving hole, and
wherein the adhesive member attaches the flange to the first supporting member, forming a waterproof structure between the speaker module and the first supporting member.

8. The electronic device of claim 7, wherein the speaker module further defines a screw hole formed through the flange.

9. The electronic device of claim 7, wherein the speaker module further includes at least one contact pad disposed to face a rear surface of the electronic device at an area in which the flange is formed.

10. The electronic device of claim 7, further comprising a stepped portion formed in at least a portion of a periphery of the receiving hole on an opposite surface of the first supporting member,
wherein a rear surface of the speaker module is supported by the stepped portion so that at least a portion of the speaker module is disposed between the stepped portion and the display.

11. The electronic device of claim 10, wherein a portion of an inner wall of the receiving hole includes a portion of an inner side surface of the side bezel structure, and wherein the stepped portion is formed on the inner side surface of the side bezel structure.

12. An electronic device, comprising:
a side bezel structure at least partially circumferentially surrounding a space defined between a front surface and a rear surface of the electronic device;
a first supporting member disposed in the space;
a display disposed on one surface of the first supporting member to output a screen towards a frontal direction of the electronic device;
a rear plate coupled with the side bezel structure and facing an opposite surface of the first supporting member;
a waterproofing member coupling the rear plate to the side bezel structure; and
a speaker module including a flange disposed between the first supporting member and the display,
wherein the flange is attached to the first supporting member, forming a waterproof structure between the flange and the first supporting member.

13. The electronic device of claim 12, wherein at least a portion of the speaker module is disposed between a front surface of the electronic device and the waterproofing member.

14. The electronic device of claim 12, further comprising an adhesive member attaching the flange to the first supporting member.

15. The electronic device of claim 12, wherein the first supporting member defines a receiving hole, and
wherein at least a portion of the speaker module is disposed in the receiving hole, and the flange is attached to the first supporting member around the receiving hole.

16. The electronic device of claim 15, wherein the speaker module further includes a casing at least partially disposed in the receiving hole, and a cover member coupled to one surface of the casing, disposed to face a front surface of the electronic device, and
wherein the flange extends from an outer side surface of the casing or an outer side surface of the cover member.

* * * * *